US012156023B2

(12) United States Patent
Payyappilly et al.

(10) Patent No.: US 12,156,023 B2
(45) Date of Patent: Nov. 26, 2024

(54) NON-ACCESS STRATUM SIGNALING OVER A NON-3GPP NETWORK

(71) Applicant: QUALCOMM Incorporated, San Diego, CA (US)

(72) Inventors: Ajith Tom Payyappilly, San Diego, CA (US); Juan Zhang, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/303,078

(22) Filed: May 19, 2021

(65) Prior Publication Data

US 2022/0377538 A1  Nov. 24, 2022

(51) Int. Cl.
*H04W 12/033* (2021.01)
*H04L 9/40* (2022.01)
*H04L 69/16* (2022.01)
*H04W 12/037* (2021.01)
*H04W 12/041* (2021.01)
*H04W 12/0471* (2021.01)
(Continued)

(52) U.S. Cl.
CPC ......... *H04W 12/033* (2021.01); *H04L 63/029* (2013.01); *H04L 63/164* (2013.01); *H04L 63/166* (2013.01); *H04L 69/16* (2013.01); *H04W 12/037* (2021.01); *H04W 12/041* (2021.01); *H04W 12/0471* (2021.01); *H04W 12/37* (2021.01); *H04W 84/12* (2013.01)

(58) Field of Classification Search
USPC ........................................................ 713/151
See application file for complete search history.

(56) References Cited

U.S. PATENT DOCUMENTS

| 2009/0111423 | A1* | 4/2009 | Somasundaram | .... H04W 80/02 |
| | | | | 455/410 |
| 2011/0286343 | A1* | 11/2011 | Powell | .................. H04W 76/10 |
| | | | | 370/252 |
| 2015/0181514 | A1 | 6/2015 | Belghoul et al. | |

(Continued)

OTHER PUBLICATIONS

3GPP TS 23.502: "3rd Generation Partnership Project, Technical Specification Group Services and System Aspects, Procedures for the 5G System (5GS), Stage 2 (Release 17)", 3GPP Standard, 3GPP, Mobile Competence Centre, 650, Route Des Lucioles, F-06921 Sophia-Antipolis Cedex, France, vol. SA WG2, No. V17.0.0, Mar. 31, 2021, pp. 1-640, XP052000251.

(Continued)

*Primary Examiner* — Sanchit K Sarker
(74) *Attorney, Agent, or Firm* — Harrity & Harrity, LLP

(57) ABSTRACT

Various aspects of the present disclosure generally relate to wireless communication. In some aspects, a cellular modem may transmit, to an applications processor, an indication to use a non-Third Generation Partnership Project (non-3GPP) interworking function (N3IWF) for non-access stratum (NAS) signaling. Accordingly, the cellular modem may establish a first virtual interface with the applications processor. The cellular modem may further perform an Internet Key Exchange (IKE) procedure with a core network using the first virtual interface and the N3IWF and transmit a key generated during the IKE procedure to the applications processor. Numerous other aspects are described.

29 Claims, 23 Drawing Sheets

(51) Int. Cl.
*H04W 12/37* (2021.01)
*H04W 84/12* (2009.01)

(56) References Cited

U.S. PATENT DOCUMENTS

| | | | |
|---|---|---|---|
| 2019/0037516 A1* | 1/2019 | Kim | H04W 60/005 |
| 2021/0058773 A1* | 2/2021 | Alnås | H04L 63/0457 |
| 2021/0127271 A1 | 4/2021 | Wu | |
| 2024/0022952 A1* | 1/2024 | Talebi Fard | H04W 72/543 |

OTHER PUBLICATIONS

Anonymous: "3rd Generation Partnership Project, Technical Specification Group Services and System Aspects, Study on Access Traffic Steering, Switch and Splitting Support in the 5G System Architecture (Release 16)", 3GPP TR 23.793 V16.0.0, Dec. 1, 2018, 114 Pages, XP055733577, Paragraphs [0006]-[6.1.2], Figures 6.1-1, Paragraphs [6.1.5]-[6.1.5.2], Figures 6.1.5.2-1.
International Search Report and Written Opinion—PCT/US2022/071779—ISA/EPO—Oct. 5, 2022.
Motorola Mobility, et al., "Operation with Tunnel-Mode Security Associations", SA WG2 Meeting #127-bis, S2-184801_N3GPP_TUNNEL_V2, 3rd Generation Partnership Project, Mobile Competence Centre, 650, Route Des Lucioles, F-06921 Sophia-Antipolis Cedex, France, vol. SA WG2, No. Newport Beach, CA, USA, May 28, 2018-Jun. 1, 2018, May 27, 2018, 6 Pages, XP051448320, Paragraphs [0001]-[02.3], Figures 2.2-1-2.3-2.
Partial International Search Report—PCT/US2022/071779—ISA/EPO—Jul. 14, 2022.

\* cited by examiner

NON-ACCESS STRATUM SIGNALING OVER A NON-3GPP NETWORK

FIELD OF THE DISCLOSURE

Aspects of the present disclosure generally relate to wireless communication and to techniques and apparatuses for non-access stratum signaling over a non-Third Generation Partnership Project network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes an applications processor configured to receive non-access stratum (NAS) messages from a cellular modem using a first virtual interface, wherein the NAS messages are encoded using transmission control protocol (TCP); and instruct a WiFi modem to transmit the encoded NAS messages.

In some aspects, a UE for wireless communication includes a cellular modem configured to transmit, to an applications processor, an indication to use an N3IWF for NAS signaling; establish a first virtual interface with the applications processor; perform an Internet Key Exchange (IKE) procedure with a core network using the first virtual interface and the N3IWF; and transmit a key generated during the IKE procedure to the applications processor.

In some aspects, a UE for wireless communication includes an applications processor configured to receive NAS messages from a cellular modem using a first virtual interface; encode the NAS messages using TCP; and instruct a WiFi modem to transmit the encoded NAS messages.

In some aspects, a UE for wireless communication includes a cellular modem configured to receive, from an applications processor, a request to use an N3IWF for NAS signaling; transmit, to the applications processor, an NAS payload to transmit over the N3IWF; and receive, from the applications processor and based at least in part on transmitting the NAS payload, an indication of a source Internet protocol (IP) address and a destination IP address associated with a core network.

In some aspects, a method of wireless communication performed by an applications processor of a UE includes receiving NAS messages from a cellular modem using a first virtual interface, wherein the NAS messages are encoded using TCP; and instructing a WiFi modem to transmit the encoded NAS messages.

In some aspects, a method of wireless communication performed by a cellular modem of a UE includes transmitting, to an applications processor, an indication to use an N3IWF for NAS signaling; establishing a first virtual interface with the applications processor; performing an IKE procedure with a core network using the first virtual interface and the N3IWF; and transmitting a key generated during the IKE procedure to the applications processor.

In some aspects, a method of wireless communication performed by an applications processor of a UE includes receiving NAS messages from a cellular modem using a first virtual interface; encoding the NAS messages using TCP; and instructing a WiFi modem to transmit the encoded NAS messages.

In some aspects, a method of wireless communication performed by a cellular modem of a UE includes receiving, from an applications processor, a request to use an N3IWF for NAS signaling; transmitting, to the applications processor, an NAS payload to transmit over the N3IWF; and receiving, from the applications processor and based at least in part on transmitting the NAS payload, an indication of a source IP address and a destination IP address associated with a core network.

In some aspects, a non-transitory computer-readable medium storing a set of instructions for wireless communication includes one or more instructions that, when executed by an applications processor, cause the applications processor to receive NAS messages from a cellular modem using a first virtual interface, wherein the NAS messages are encoded using TCP; and instruct a WiFi modem to transmit the encoded NAS messages.

In some aspects, a non-transitory computer-readable medium storing a set of instructions for wireless communication includes one or more instructions that, when executed by a cellular modem, cause the cellular modem to transmit, to an applications processor, an indication to use an N3IWF for NAS signaling; establish a first virtual interface with the applications processor; perform an IKE procedure with a core network using the first virtual interface and the N3IWF; and transmit a key generated during the IKE procedure to the applications processor.

In some aspects, a non-transitory computer-readable medium storing a set of instructions for wireless communication includes one or more instructions that, when executed by an applications processor, cause the applications processor to receive NAS messages from a cellular modem using a first virtual interface; encode the NAS messages using TCP; and instruct a WiFi modem to transmit the encoded NAS messages.

In some aspects, a non-transitory computer-readable medium storing a set of instructions for wireless communication includes one or more instructions that, when executed by a cellular modem, cause the cellular modem to receive, from an applications processor, a request to use an N3IWF for NAS signaling; transmit, to the applications processor, an NAS payload to transmit over the N3IWF; and receive, from the applications processor and based at least in part on transmitting the NAS payload, an indication of a source IP address and a destination IP address associated with a core network.

In some aspects, an apparatus for wireless communication includes means for receiving NAS messages from a cellular modem using a first virtual interface, wherein the NAS messages are encoded using TCP; and means for instructing a WiFi modem to transmit the encoded NAS messages.

In some aspects, an apparatus for wireless communication includes means for transmitting, to an applications processor, an indication to use an N3IWF for NAS signaling; means for establishing a first virtual interface with the applications processor; means for performing an IKE procedure with a core network using the first virtual interface and the N3IWF; and means for transmitting a key generated during the IKE procedure to the applications processor.

In some aspects, an apparatus for wireless communication includes means for receiving NAS messages from a cellular modem using a first virtual interface; means for encoding the NAS messages using TCP; and means for instructing a WiFi modem to transmit the encoded NAS messages.

In some aspects, an apparatus for wireless communication includes means for receiving, from an applications processor, a request to use an N3IWF for NAS signaling; means for transmitting, to the applications processor, an NAS payload to transmit over the N3IWF; and means for receiving, from the applications processor and based at least in part on transmitting the NAS payload, an indication of a source IP address and a destination IP address associated with a core network.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
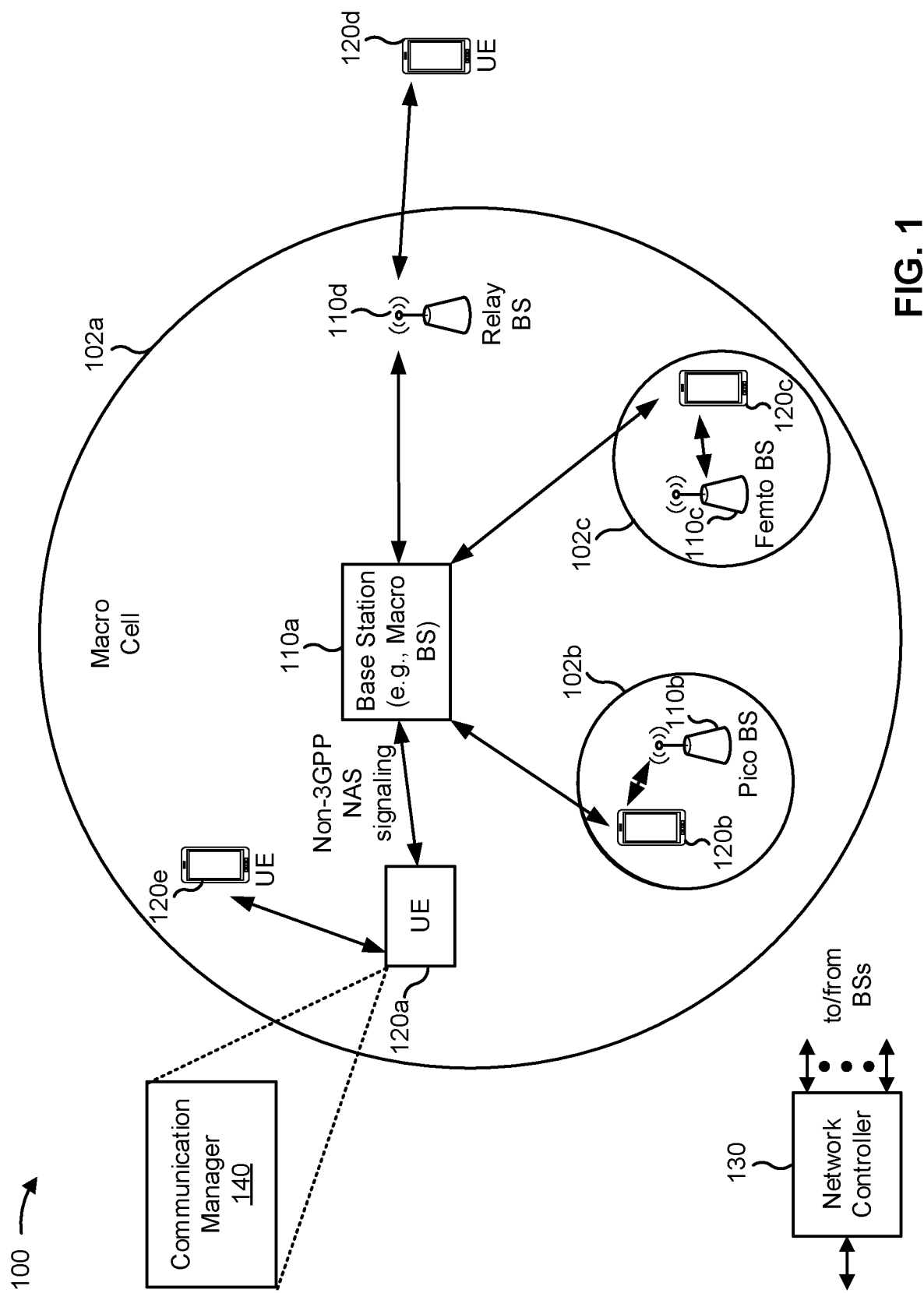
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive non-access stratum (NAS) messages from a cellular modem using a first virtual interface, the NAS messages being encoded using transmission control protocol (TCP), and instruct a WiFi modem to transmit the encoded NAS messages. As an alternative, the communication manager 140 may receive NAS messages from a cellular modem using a first virtual interface, encode the NAS messages using TCP, and instruct a WiFi modem to transmit the encoded NAS messages. Additionally, or alternatively, the communication manager 140 may perform one or more other operations described herein.

Additionally, or alternatively, and as described in more detail elsewhere herein, the communication manager 140 may transmit, to an applications processor, an indication to use a non-Third Generation Partnership Project (non-3GPP) interworking function (N3IWF) for NAS signaling, establish a first virtual interface with the applications processor, perform an Internet Key Exchange (IKE) procedure with a core network using the first virtual interface and the N3IWF, and transmit a key generated during the RE procedure to the applications processor. As an alternative, the communication manager 140 may receive, from an applications processor, a request to use an N3IWF for NAS signaling; transmit, to the applications processor, an NAS payload to transmit over the N3IWF; and receive, from the applications processor and based at least in part on transmitting the NAS payload, an indication of a source Internet protocol (IP) address and a destination IP address associated with a core network. Additionally, or alternatively, the communication manager 140 may perform one or more other operations described herein.

As indicated above, FIG. 1 is provided as an example. Other examples may differ from what is described with regard to FIG. 1.

Figure 2:
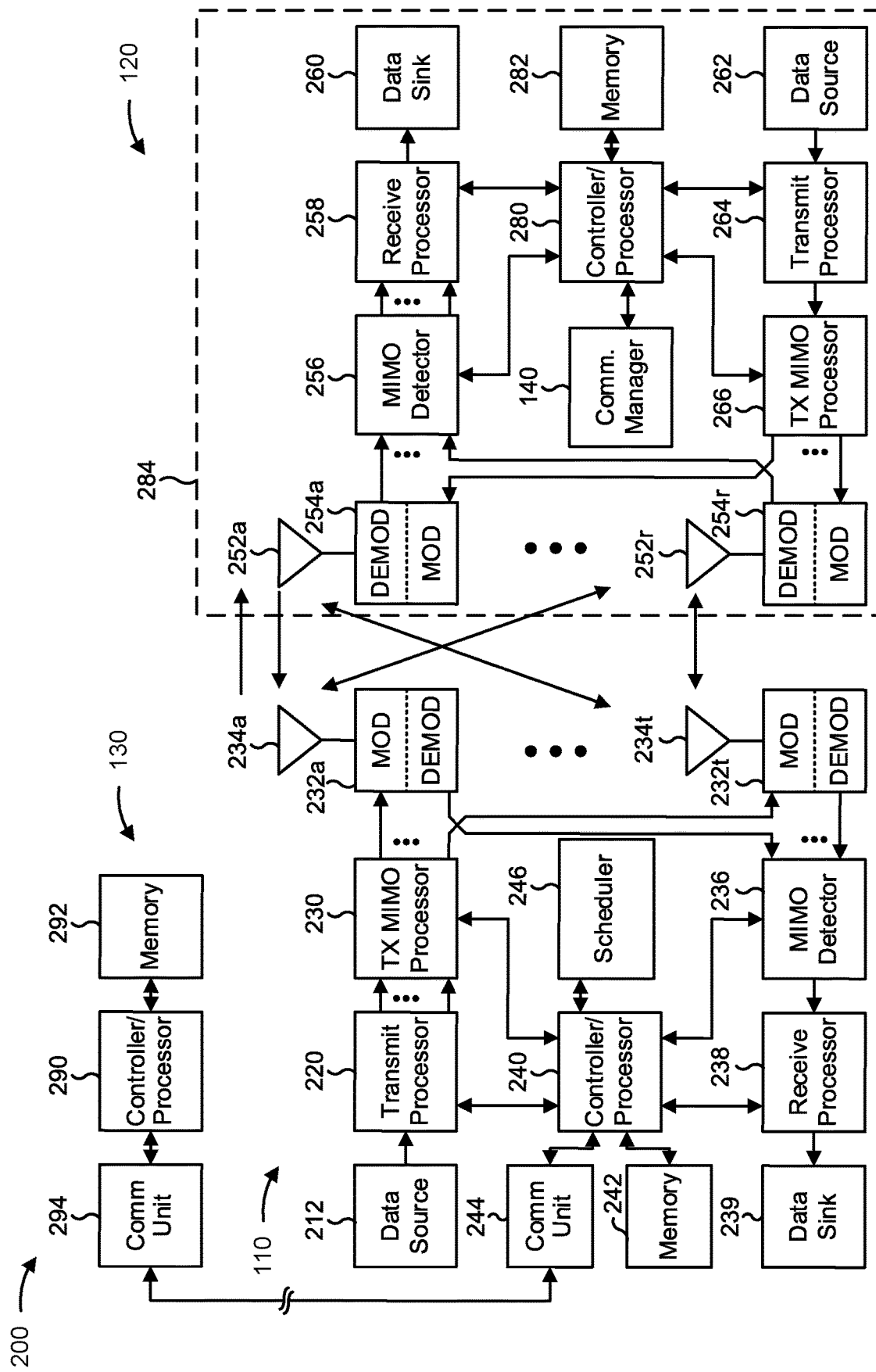
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 3-15).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 3-15).

Controller/processor 240 of base station 110, controller/processor 280 of UE 120, and/or any other component(s) of FIG. 2 may perform one or more techniques associated with NAS signaling over a non-3GPP network, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, and/or other processes as described herein. In some aspects, executing instructions may include running the instructions, converting the instructions, compiling the instructions, and/or interpreting the instructions, among other examples. In some aspects, the applications processor described herein is included in the UE 120 and/or includes one or more components of the UE 120 shown in FIG. 2. Similarly, in some aspects, the cellular modem described herein is included in the UE 120 and/or includes one or more components of the UE 120 shown in FIG. 2.

In some aspects, an applications processor may include means for receiving NAS messages from a cellular modem using a first virtual interface, wherein the NAS messages are encoded using TCP; and/or means for instructing a WiFi modem to transmit the encoded NAS messages. In some aspects, the means for the applications processor to perform operations described herein may include, for example, one or more of communication manager 140, MIMO detector 256, receive processor 258, transmit processor 264, TX MIMO processor 266, controller/processor 280, or memory 282.

In some aspects, a cellular modem may include means for transmitting, to an applications processor, an indication to use an N3IWF for NAS signaling; means for establishing a first virtual interface with the applications processor; means for performing an IKE procedure with a core network using the first virtual interface and the N3IWF; and/or means for transmitting a key generated during the IKE procedure to the applications processor. In some aspects, the means for the cellular modem to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, an applications processor may include means for receiving NAS messages from a cellular modem using a first virtual interface; means for encoding the NAS messages using TCP; and/or means for instructing a WiFi modem to transmit the encoded NAS messages. In some aspects, the means for the applications processor to perform operations described herein may include, for example, one or more of communication manager 140, MIMO detector 256, receive processor 258, transmit processor 264, TX MIMO processor 266, controller/processor 280, or memory 282.

In some aspects, a cellular modem may include means for receiving, from an applications processor, a request to use an N3IWF for NAS signaling; means for transmitting, to the applications processor, an NAS payload to transmit over the N3IWF; and/or means for receiving, from the applications processor and based at least in part on transmitting the NAS payload, an indication of a source IP address and a destination IP address associated with a core network. In some aspects, the means for the cellular modem to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In LTE networks, UEs communicated with core networks using an evolved packet data gateway (EPDG). For example, the UEs could use standards promulgated by the Internet engineering task force (IETF), such as IKE protocols, Internet protocol security (IPsec) protocols, and/or additional IETF protocols, to communicate with the EPDG. Accordingly, UEs could use non-3GPP modems (e.g., WiFi modems and/or other wireless local area network (WLAN) modems) to communicate with the core network.

In 5G networks, UEs may communicate with core networks using an N3IWF. The N3IWF may use 3GPP specifications (e.g., NAS protocols) in addition to IETF protocols. However, the UEs often include cellular modems that are physically and logically distinct from non-3GPP modems (which are often controlled by an applications processor). Accordingly, many existing non-3GPP modems are not programmed to execute NAS protocols. When the UEs cannot communicate with a core network using the N3IWF, an access and mobility function (AMF) of the core network may be unable to perform proper handover of the UEs as the UEs move between cells. As a result, the UEs experience reduced throughput or even disconnection from the cellular network because the UEs do not properly undergo handover. Additionally, or alternatively, throughput to the UEs is reduced because the UEs cannot establish a user plane with the N3IWF, which increases latency and causes the UEs to consume additional power and processing resources.

Some techniques and apparatuses described herein enable cooperation between an applications processor (e.g., apparatus 1600 of FIG. 16) and a cellular modem (e.g., apparatus 1700 of FIG. 17) of a UE (e.g., UE 120) to communicate with an N3IWF of a core network. For example, the applications processor and the cellular modem may cooperate to establish a control plane with the N3IWF and perform NAS signaling with the N3IWF. As a result, an AMF of the core network may perform proper handover of the UE 120 as the UE 120 moves between cells, which results in increased throughput as compared with the AMF being unable to perform handover. Additionally, or alternatively, the applications processor and the cellular modem may cooperate to establish a user plane with the N3IWF. As a result, throughput to the UE 120 is increased, which reduces latency and causes the UE 120 to conserve power and processing resources.

Figure 3:
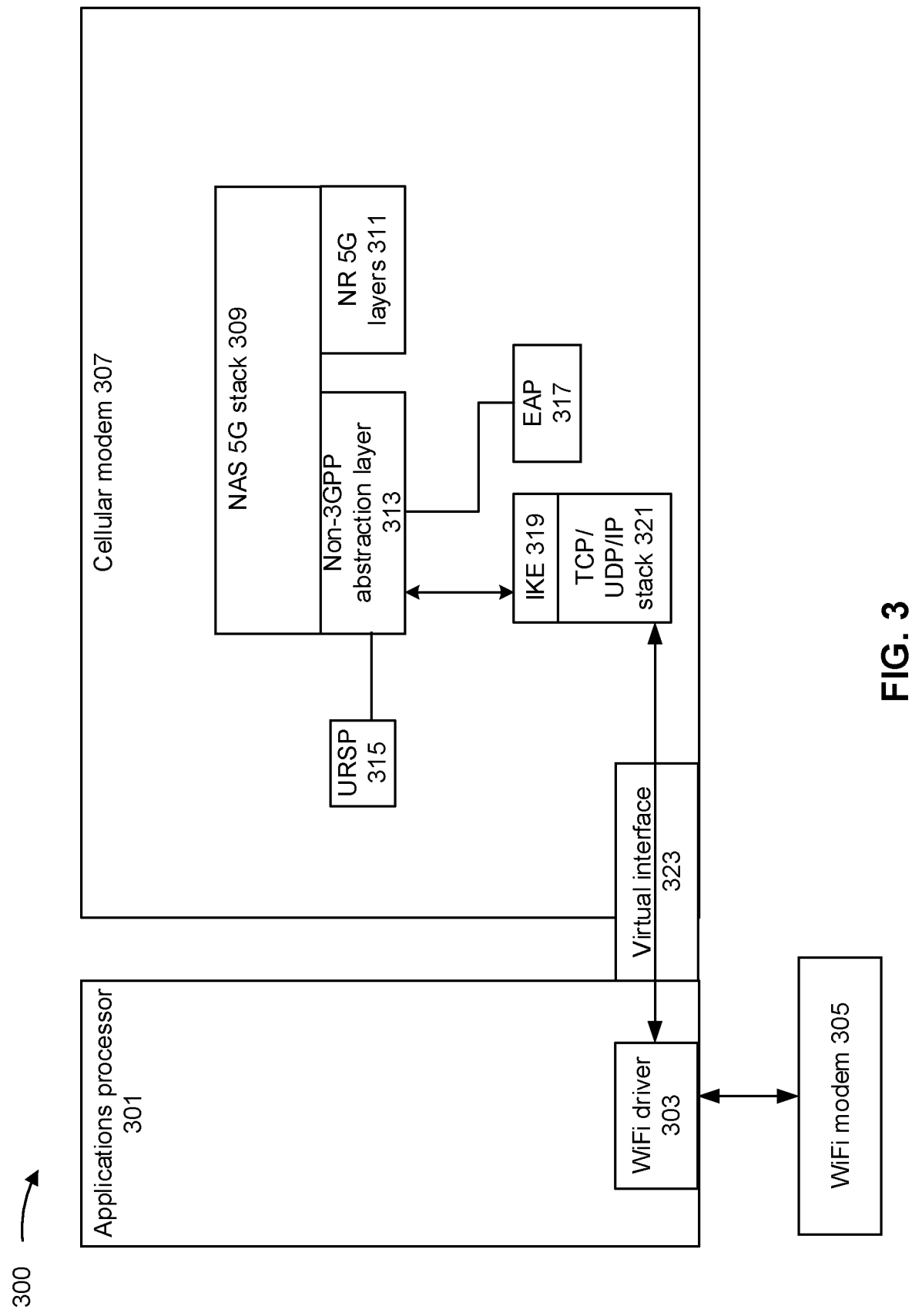
FIGS. 3 and 4 are diagrams illustrating examples associated with control planes for non-access stratum (NAS) signaling over a non-3GPP interworking function (N3IWF), in accordance with the present disclosure.

FIG. 3 is a diagram illustrating an example 300 associated with a control plane for NAS signaling over an N3IWF, in accordance with the present disclosure. Example 300 may be at least partially included in a UE (e.g., UE 120).

As shown in FIG. 3, example 300 includes an applications processor 301. The applications processor 301 may provide an environment for a high-level operating system (HLOS) of the UE 120 as well as a driver 303 for a non-3GPP modem 305. For example, as shown in FIG. 3, the modem 305 may include a WiFi modem and/or another type of WLAN modem.

As shown in FIG. 3, example 300 further includes a cellular modem 307. The cellular modem 307 may implement a NAS stack 309 according to 5G protocols (e.g., 3GPP specifications and/or another standard). The NAS stack 309 may support NR layers 311, which may include a radio resource control (RRC) layer and/or one or more L2 layers (e.g., a medium access control (MAC) layer, a radio link control (RLC) layer, and/or another L2 layer).

In some aspects, the cellular modem 307 may further implement a non-3GPP abstraction layer 313. The abstraction layer 313 may activate in accordance with a policy associated with the UE 120 (e.g., as indicated by a UE route selection policy (URSP) 315 and/or another policy associated with the UE 120). The abstraction layer 313 may also perform authentication according to an extensible authentication protocol (EAP) 317. For example, the EAP 317 may be implemented according to the Institute of Electrical and Electronics Engineers (IEEE) Local Area Network/Metropolitan Area Network (LAN/MAN) Standards Committee's 802.11 standards (also referred to as "IEEE 802.11 protocols").

In example 300, the cellular modem 307 also implements one or more IETF protocols, such as an IKE 319 and/or a TCP/user datagram protocol (UDP)/IP stack 321. Accordingly, the abstraction layer 313 may pass NAS messages to the IKE 319 for encryption and to the TCP/UDP/IP stack 321 for encoding before providing the NAS messages to the applications processor 301. As used herein, "encoding using TCP" may refer to one or more of dividing the NAS messages into TCP segments (e.g., according to a maximum segment size associated with the TCP/UDP/IP stack 321), adding TCP headers, and/or encapsulating into IP datagrams. Accordingly, in one example, the cellular modem 307 may divide a NAS message into one or more TCP segments, add one or more corresponding TCP headers to the TCP segment(s), and encapsulate the TCP segment(s) in one or more IP datagrams with the corresponding TCP header(s). The applications processor 301 may receive the NAS messages as TCP packets from the cellular modem 307. As shown in FIG. 3, the cellular modem 307 and the applications processor 301 may communicate using a virtual interface 323. For example, the virtual interface 323 may include a reverse remote network (rmnet) interface (e.g., as defined in Android protocols) and/or a reverse remote virtual interface (RVI) (e.g., as defined in iOS protocols).

Accordingly, the applications processor 301 may transmit the NAS messages using the WiFi modem 305. For example, the WiFi modem 305 may transmit the NAS messages to an N3IWF associated with a core network.

By using techniques as described in connection with FIG. 3, the UE 120 may enable communication with the N3IWF by implementing the abstraction layer 313 and IETF protocols on the cellular modem 307. Accordingly, the UE 120 may perform NAS signaling with the N3IWF. As a result, an AMF of the core network may perform proper handover of the UE 120 as the UE 120 moves between cells, which results in increased throughput as compared with the AMF being unable to perform handover.

As indicated above, FIG. 3 is provided as an example. Other examples may differ from what is described with regard to FIG. 3.

Figure 4:
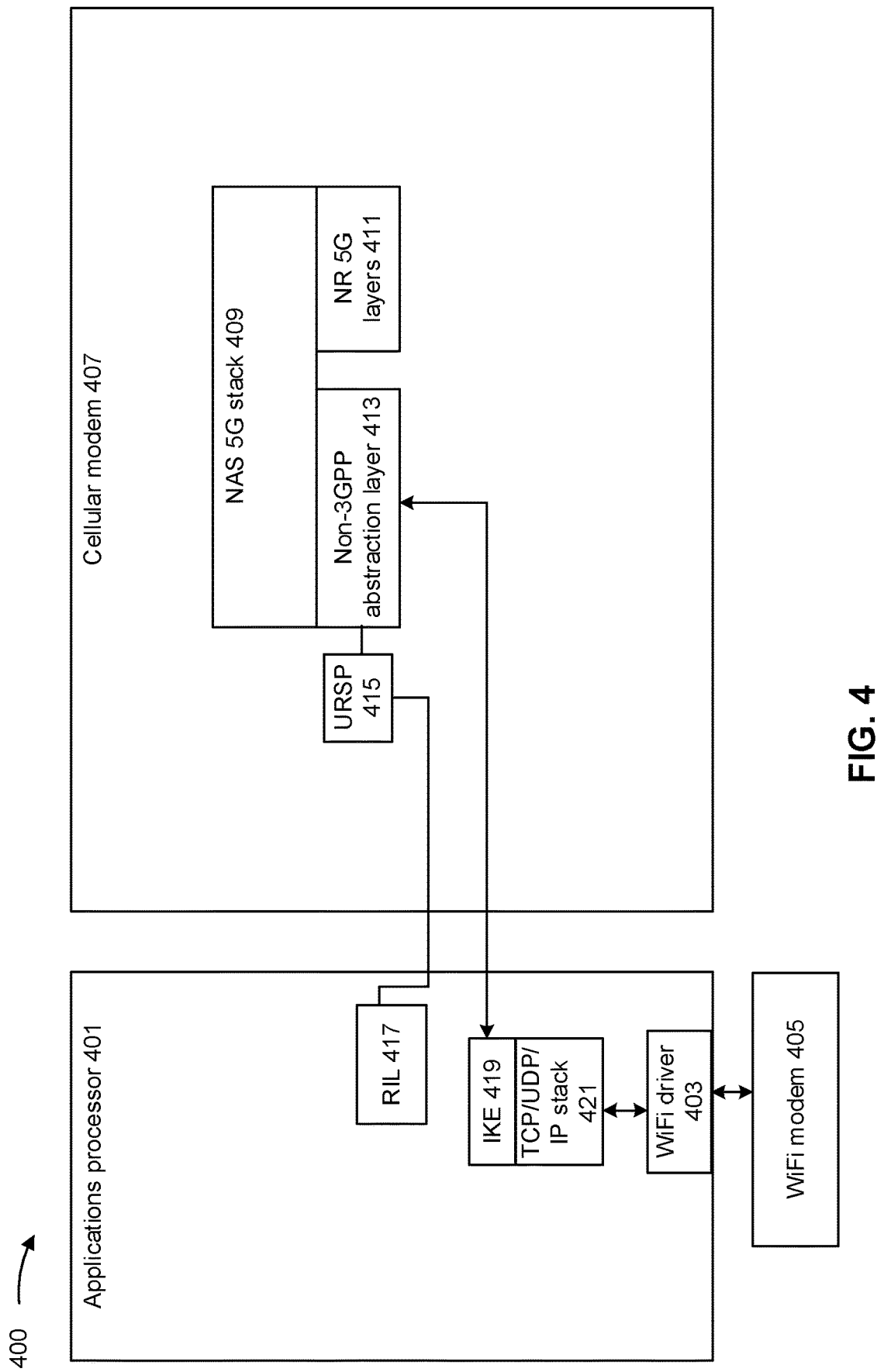

FIG. 4 is a diagram illustrating an example 400 associated with a control plane for NAS signaling over an N3IWF, in accordance with the present disclosure. Example 400 may be at least partially included in a UE (e.g., UE 120).

As shown in FIG. 4, example 400 includes an applications processor 401. The applications processor 401 may provide an environment for an HLOS of the UE 120 as well as a driver 403 for a non-3GPP modem 405. For example, as shown in FIG. 4, the modem 405 may include a WiFi modem and/or another type of WLAN modem.

As shown in FIG. 4, example 400 further includes a cellular modem 407. The cellular modem 407 may implement a NAS stack 409 according to 5G protocols (e.g., 3GPP specifications and/or another standard). The NAS stack 409 may support NR layers 411, which may include an RRC layer and/or one or more L2 layers (e.g., a MAC layer, an RLC layer, and/or another L2 layer).

In some aspects, the cellular modem 407 may further implement a non-3GPP abstraction layer 413. The abstraction layer 413 may activate in accordance with a policy associated with the UE 120 (e.g., as indicated by a URSP 415 and/or another policy associated with the UE 120). In example 400, the applications processor 401 may activate the abstraction layer 413 in accordance with the URSP 415, which is accessed using a radio interface layer (RIL) 417 between the applications processor 401 and the cellular modem 407.

In example 400, the applications processor 401 also implements one or more IETF protocols, such as an IKE 419 and/or a TCP/UDP/IP stack 421. Accordingly, the abstraction layer 413 may provide NAS messages to the applications processor 401 for encryption with the IKE 419 and for encoding with the TCP/UDP/IP stack 421. As used herein, "encoding using TCP" may refer to one or more of dividing the NAS messages into TCP segments (e.g., according to a maximum segment size associated with the TCP/UDP/IP stack 421), adding TCP headers, and/or encapsulating into an IP datagram. Accordingly, in one example, the applications processor 401 may divide a NAS message into one or more TCP segments, add one or more corresponding TCP headers to the TCP segment(s), and encapsulate the TCP segment(s) in one or more IP datagrams with the corresponding TCP header(s). Additionally, the applications processor 401 may transmit the NAS messages using the WiFi modem 405. For example, the WiFi modem 405 may transmit the NAS messages to an N3IWF associated with a core network.

By using techniques as described in connection with FIG. 4, the UE 120 may enable communication with the N3IWF by implementing the abstraction layer 413 on the cellular modem 407 and using IETF protocols as implemented on the applications processor 401. Accordingly, the UE 120 may perform NAS signaling with the N3IWF. As a result, an AMF of the core network may perform proper handover of the UE 120 as the UE 120 moves between cells, which results in increased throughput as compared with the AMF being unable to perform handover.

As indicated above, FIG. 4 is provided as an example. Other examples may differ from what is described with regard to FIG. 4.

Figure 5:
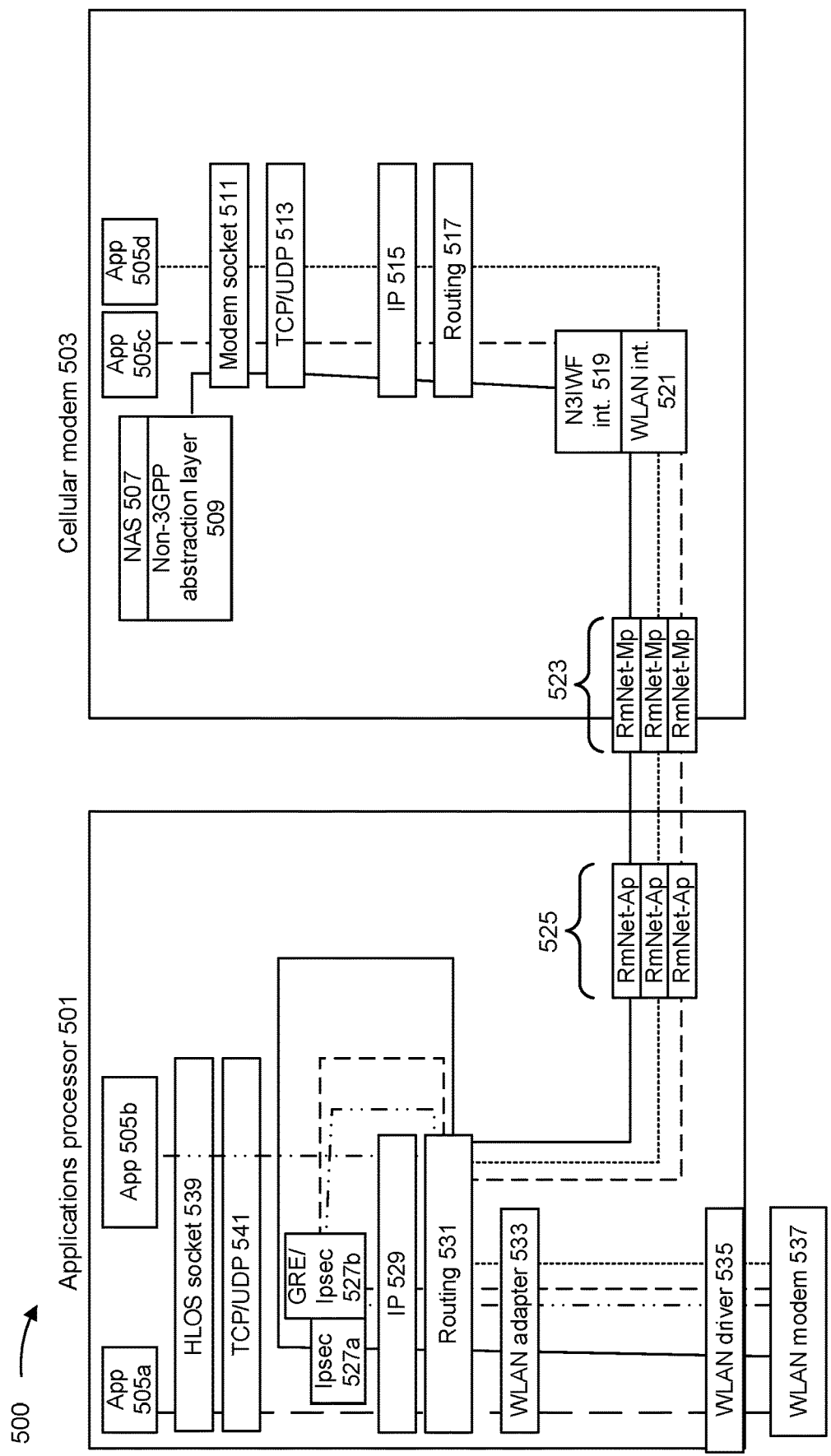
FIG. 5 is a diagram illustrating an example associated with a user plane for signaling over an N3IWF, in accordance with the present disclosure.

FIG. 5 is a diagram illustrating an example 500 associated with a user plane for signaling over an N3IWF, in accordance with the present disclosure. As shown in FIG. 5, example 500 includes an applications processor 501. The applications processor 501 may provide an environment for an HLOS of the UE 120. As shown in FIG. 5, example 500 further includes a cellular modem 503. The applications processor 501 and the cellular modem 503 may both support applications (e.g., application 505a may provide an over-the-top (OTT) service, application 505b may provide an IP multimedia subsystem (IMS) service, application 505c may provide an IMS service, and application 505d may provide a global position system (GPS) service).

The cellular modem 503 may also implement a NAS stack 507 according to 5G protocols (e.g., 3GPP specifications and/or another standard). The NAS stack 507 may support an abstraction layer 509, similar to abstraction layer 313 described above in connection with FIG. 3 and/or abstraction layer 413 described above in connection with FIG. 4.

Accordingly, the abstraction layer 509 may transmit NAS messages by providing the NAS messages to the applications processor 501. For example, the abstraction layer 509 may pass NAS messages through a modem socket 511, a TCP/UDP stack 513, an IP 515, a routing function 517, and an interface 519 associated with an N3IWF. Similarly, applications supported by the cellular modem 503 (e.g., application 505c and/or application 505d) may transmit data by providing the data to the applications processor 501. For example, the application may pass data through the modem socket 511, the TCP/UDP stack 513, the IP 515, the routing function 517, and an interface 521 associated with a non-3GPP interface (e.g., a WLAN interface in example 500).

Accordingly, the applications processor 501 may receive NAS messages and/or data using a set 525 of virtual interfaces at the applications processor 501 that connect to a corresponding set 523 of virtual interfaces at the cellular modem 503. For example, one pair of virtual interfaces may be associated with NAS messages, another pair of virtual interfaces may be associated with the application 505c, and yet another pair of virtual interfaces may be associated with the application 505d. In example 500, the virtual interfaces include reverse rmnets implemented at the applications processor 501 (each shown as "RmNet-AP" in example 500) and reverse rmnets implemented at the cellular modem 503 (each shown as "RmNet-MP" in example 500). However, other examples may include RVIs and/or other virtual interfaces between the applications processor 501 and the cellular modem 503.

The applications processor 501 may pass Internet-based communications, such as NAS messages and data (e.g., from the application 505c), through an IPsec tunnel (e.g., established with the N3IWF), such as through IPsec tunnel 527a or through IPsec tunnel 527b after encapsulation with generic routing encapsulation (GRE). The applications processor 501 may, in some aspects, additionally apply an IP 529, a routing function 531, and a WLAN adaptation function 533. The applications processor 501 also supports a driver 535 for a non-3GPP modem 537. For example, as shown in FIG. 5, the modem 537 may include a WLAN modem, such as a WiFi modem. Accordingly, the applications processor 501 may transmit NAS messages and/or data using the WLAN modem 537. For example, the WLAN modem 537 may transmit the NAS messages and/or the data to the N3IWF.

Some types of data may bypass one or more functions of the applications processor 501. For example, as shown in FIG. 5, data from the application 505d may proceed to the routing function 531 without passing through an IPsec tunnel or the IP 529.

Applications supported by the applications processor 501 (e.g., application 505a and/or application 505b) may also be transmitted using the WLAN modem 537. For example, data from the application 505a may pass through an HLOS socket 539 and a TCP/UDP stack 541. The application processor 501 may, in some aspects, additionally apply the IP 529, the routing function 531, and the WLAN adaptation function 533. Accordingly, the applications processor 501 may transmit the data using the WLAN modem 537. In another example, data from the application 505b may pass through the HLOS socket 539 and the TCP/UDP stack 541. The application processor 501 may, in some aspects, additionally use the IPsec tunnel 527b after encapsulation with GRE, the IP 529, the routing function 531, and the WLAN adaptation function 533. Accordingly, the applications processor 501 may transmit the data using the WLAN modem 537.

By using techniques as described in connection with FIG. 5, the applications processor 501 and the cellular modem 503 may cooperate to establish a user plane with the N3IWF. As a result, throughput to the UE 120 is increased, which reduces latency and causes the UE 120 to conserve power and processing resources.

As indicated above, FIG. 5 is provided as an example. Other examples may differ from what is described with regard to FIG. 5.

Figure 6A:
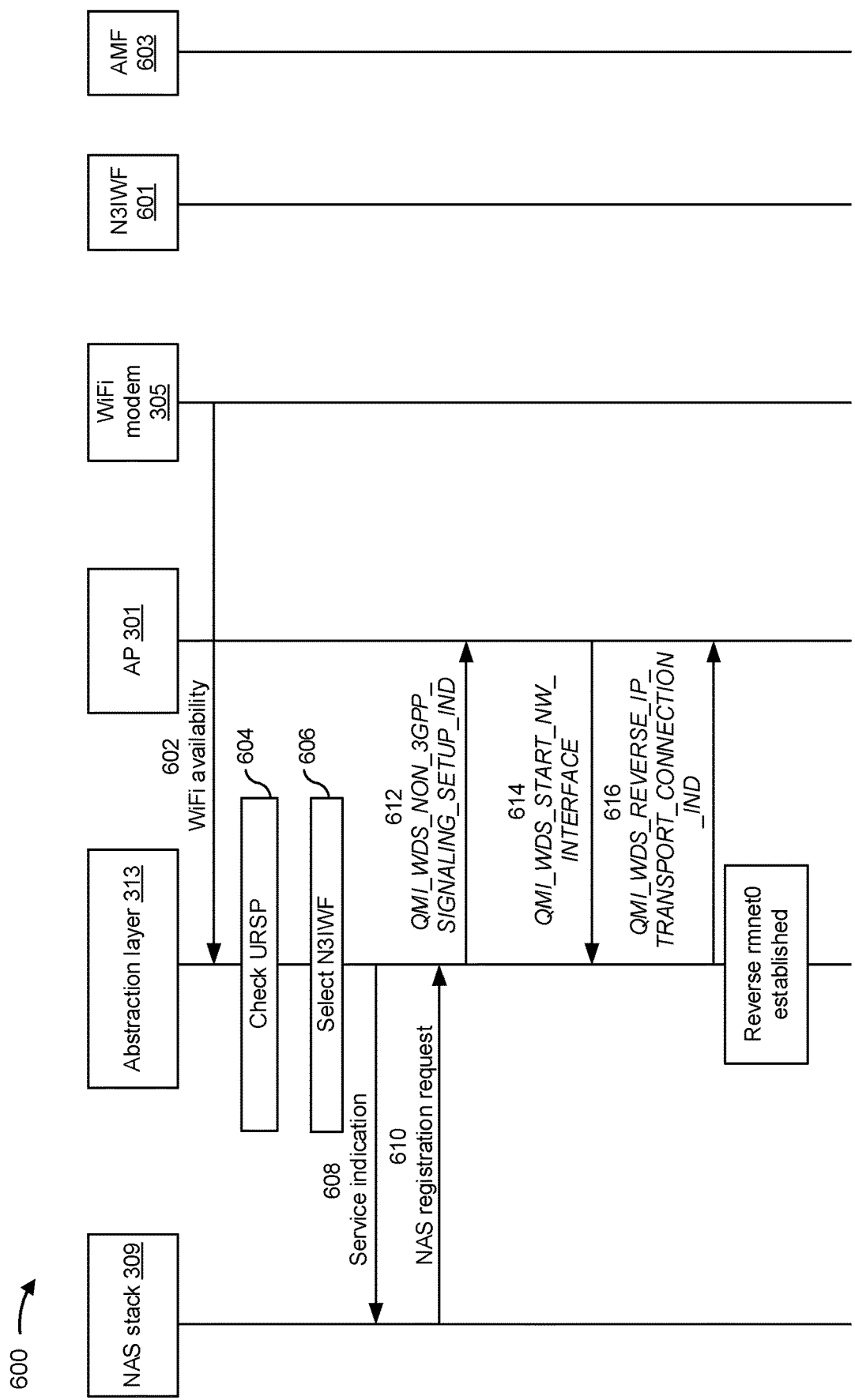
FIGS. 6A, 6B, and 6C are diagrams illustrating an example associated with establishing a control plane with an N3IWF, in accordance with the present disclosure.
Figure 6B:
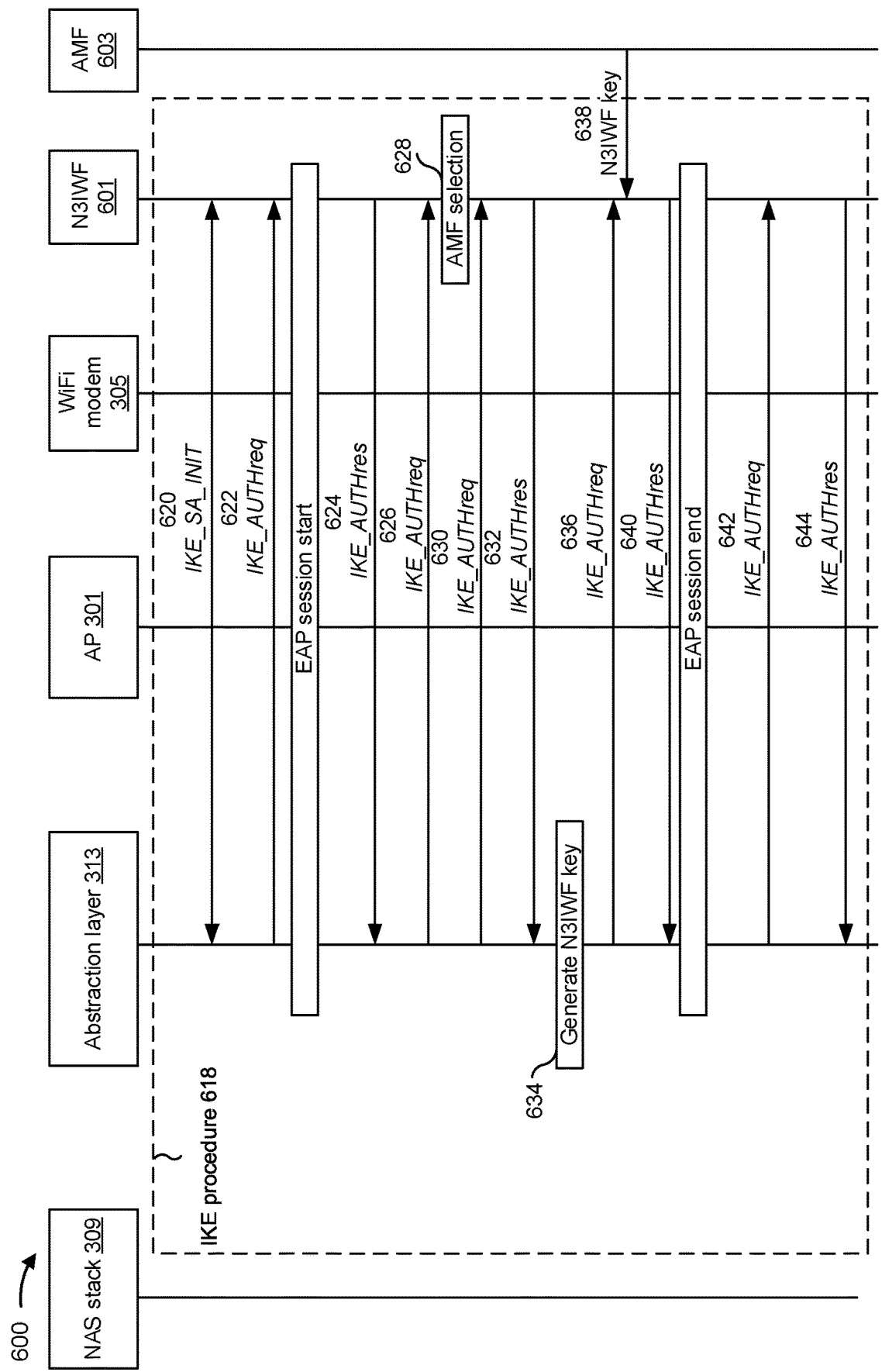
Figure 6C:
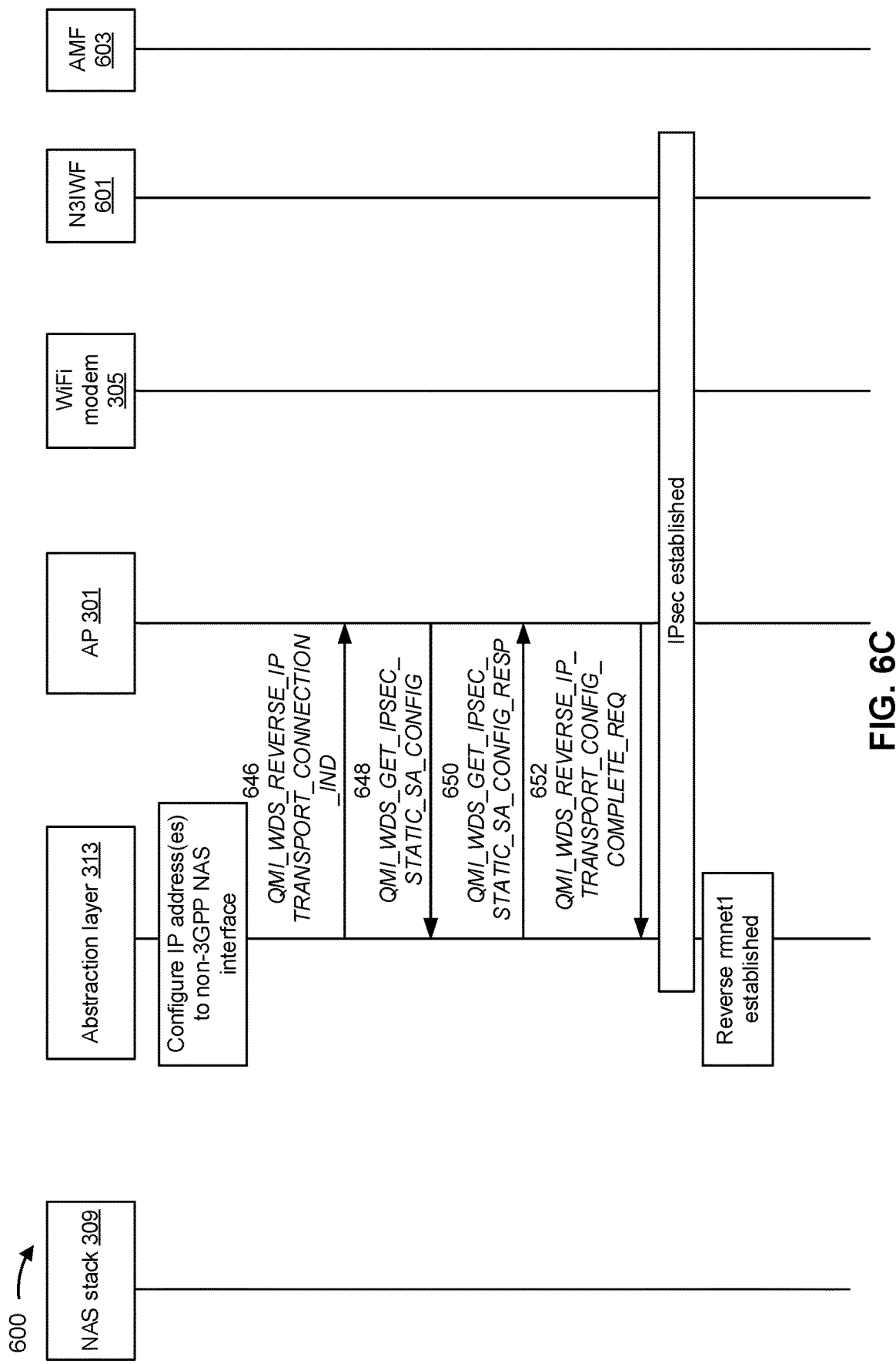

FIGS. 6A, 6B, and 6C are diagrams illustrating an example 600 associated with establishing a control plane with an N3IWF, in accordance with the present disclosure. Example 600 may be implemented by a UE 120 with an applications processor (e.g., an applications processor (AP) 301) in communication with a WiFi modem 305 and a cellular modem 307 (e.g., including an NAS stack 309 and an abstraction layer 313). As shown in FIGS. 6A-6C, the abstraction layer 313 may use the WiFi modem 305 to communicate with an N3IWF 601 in order to access an AMF 603 of a core network.

As shown in FIG. 6A and in connection with reference number 602, the WiFi modem 305 may transmit, and the abstraction layer 313 may receive, an indicator that a non-3GPP network (e.g., a WiFi network and/or other WLAN) is available to use. For example, the WiFi modem 305 may perform a scan of an environment of the UE 120 and determine that at least one WiFi network is available for the UE 120 to use (e.g., either because the WiFi network is public or because the UE 120 has credentials stored such that the UE 120 may access the WiFi network). As shown in FIG. 6A, the WiFi modem 305 may pass the indicator to the abstraction layer 313 via the AP 301 (e.g., using an RIL between the AP 301 and the cellular modem 307).

As shown in connection with reference number 604, the abstraction layer 313 may check a URSP 315 and/or another policy associated with the UE 120. For example, the URSP 315 may include one or more rules that accept, as input, one or more properties associated with the available WiFi network and that output an indicator of whether to use the available WiFi network for NAS signaling. Accordingly, as shown in connection with reference number 606, the abstraction layer 313 may select the N3IWF 601 based at least in part on the policy associated with the UE 120.

As shown in connection with reference number 608, the abstraction layer 313 may transmit, and the NAS stack 309 may receive, a service indication, associated with the non-3GPP network (e.g., the available WiFi network). Accordingly, as shown in connection with reference number 610, the NAS stack 309 may generate and transmit, and the abstraction layer 313 may receive, a NAS registration request. For example, the NAS stack 309 may generate the NAS registration request based at least in part on the service indication. The NAS registration request may be generated according to 3GPP specifications and/or another similar standard.

As shown in connection with reference number 612, the abstraction layer 313 may transmit, and the AP 301 may receive, an indication to use the N3IWF 601 for NAS signaling. For example, as shown in FIG. 6A, the indication may include a QMI_WDS_NON_3GPP_SIGNALING_SETUP_IND message. Accordingly, an HLOS supported by the AP 301 may determine that the cellular modem 307 is ready to perform NAS signaling over the available WiFi network based at least in part on the indication.

As shown in connection with reference numbers 614 and 616, the AP 301 and the cellular modem 307 may establish a first virtual interface (e.g., "reverse rmnet0" as shown in example 600). For example, as shown in connection with reference number 614, the AP 301 may transmit, and the abstraction layer 313 may receive, an indication to initiate the first virtual interface. For example, the indication may include a QMI_WDS_START_NW_INTERFACE message. In some aspects, the QMI_WDS_START_NW_INTERFACE message may include an indication of an access point name (APN) that is associated with non-3GPP NAS signaling (e.g., a variable representing APN may be set to non_3gpp_signaling). Accordingly, as shown in connection with reference number 616, the abstraction layer 313 may transmit, and the AP 301 may receive, an indication that the first virtual interface is connected. For example, the indication may include a QMI_WDS_REVERSE_IP_TRANSPORT_CONNECTION_IND message. In some aspects, the QMI_WDS_REVERSE_IP_TRANSPORT_CONNECTION_IND message may include a status indicator that represents a connected status for the first virtual interface.

Accordingly, as shown in FIG. 6B and in connection with reference number 618, the abstraction layer 313 may perform an IKE procedure with a core network using the first virtual interface and the N3IWF 601. For example, as shown in connection with reference number 620, the abstraction layer 313 may exchange, with the N3IWF 601 (e.g., via the first virtual interface, the AP 301, and the WiFi modem 305), an initial IKE key. For example, the initial IKE exchange may include an IKE_SA_INIT exchange (e.g., as defined in IKE protocols). As shown in connection with reference number 622, the abstraction layer 313 may authenticate itself with the N3IWF 601 (e.g., via the first virtual interface, the AP 301, and the WiFi modem 305). For example, the abstraction layer 313 may use an IKE_AUTHreq function (e.g., as defined in IKE protocols) with an identifier associated with the UE 120 (e.g., an Internet security association and key management protocol (ISAKMP) identifier (ID)). The abstraction layer 313 may additionally provide a payload used to authenticate the UE 120. In example 600, the payload is associated with an EAP; however, other payloads, such as a payload associated with a pre-shared key (PSK), a payload associated with Rivest-Shamir-Adleman (RSA) certificates (RSA-SIG), or a payload associated with elliptic curve digital signature algorithm certificates (ECDSA-SIG) may be additionally or alternatively used. As further shown in connection with reference number 624, the N3IWF 601 may transmit, and the abstraction layer 313 may receive (e.g., via the WiFi modem 305, the AP 301, and the first virtual interface), a confirmation of the authentication. For example, the confirmation may include an IKE_AUTHres message (e.g., as defined in IKE protocols).

As shown in connection with reference number 626, the abstraction layer 313 may request NAS registration with the N3IWF 601 (e.g., via the first virtual interface, the AP 301, and the WiFi modem 305). For example, the abstraction layer 313 may use an IKE_AUTHreq function (e.g., as defined in IKE protocols) and include, as a payload, a protocol data unit (PDU) encapsulating the NAS registration request that was received from the NAS stack 309. Accordingly, as shown in connection with reference number 628, the N3IWF 601 may select an AMF of the core network to associate with the UE 120. For example, the N3IWF 601 may select the AMF 603 based at least in part on the NAS registration request.

As shown in connection with reference number 630, the abstraction layer 313 may again authenticate itself with the N3IWF 601 (e.g., via the first virtual interface, the AP 301, and the WiFi modem 305). For example, the abstraction layer 313 may use an IKE_AAUTHreq function (e.g., as defined in IKE protocols). As further shown in connection with reference number 632, the N3IWF 601 may transmit, and the abstraction layer 313 may receive (e.g., via the WiFi modem 305, the AP 301, and the first virtual interface), a confirmation of the authentication. For example, the confirmation may include an IKE_AUTHres message (e.g., as defined in IKE protocols). Accordingly, as shown in connection with reference number 634, the abstraction layer 313 may generate an IKE key associated with the N3IWF 601. For example, the IKE key may be associated with an asymmetric encryption algorithm that the abstraction layer 313 may use to securely transmit NAS signals to the N3IWF 601.

As shown in connection with reference number 636, the abstraction layer 313 may authenticate itself with the N3IWF 601 (e.g., via the first virtual interface, the AP 301, and the WiFi modem 305) in order to terminate the EAP session (and/or other secure session, as described above). For example, the abstraction layer 313 may use an IKE_AAUTHreq function (e.g., as defined in IKE protocols) and include, as a payload, a PDU encapsulating an indicator that NAS setup is complete (e.g., an NAS security mode command (SMC) Complete message as defined in 3GPP specifications and/or another standard). Additionally, and as shown in connection with reference number 638, the selected AMF 603 may provide the N3IWF 601 with an IKE key associated with the N3IWF 601. For example, the IKE key may be associated with an asymmetric encryption algorithm that the N3IWF 601 may use to securely transmit NAS signals to the abstraction layer 313.

As further shown in connection with reference number 640, the N3IWF 601 may transmit, and the abstraction layer 313 may receive (e.g., via the WiFi modem 305, the AP 301, and the first virtual interface), a confirmation of the authentication. For example, the confirmation may include an IKE_AUTHres message (e.g., as defined in IKE protocols).

As shown in connection with reference number 642, the abstraction layer 313 may provide the N3IWF 601 (e.g., via the first virtual interface, the AP 301, and the WiFi modem 305) with one or more IP addresses (e.g., an IPv4 address, an IPv6 address, and/or another IP address) associated with the abstraction layer 313. For example, the abstraction layer 313 may use an IKE_AUTHreq function (e.g., as defined in IKE protocols) and include, as a payload, the IP address(es). Accordingly, the N3IWF 601 may use the IP address(es) to transmit NAS messages to the abstraction layer 313 (e.g., via the WiFi modem 305, the AP 301, and the first virtual interface). Similarly, and as shown in connection with reference number 644, the N3IWF 601 may transmit, and the abstraction layer 313 may receive (e.g., via the WiFi modem 305, the AP 301, and the first virtual interface), one or more IP addresses (e.g., an IPv4 address, an IPv6 address, and/or another IP address) and/or one or more ports (e.g., a TCP port) associated with the N3IWF 601. For example, the N3IWF 601 may use an IKE_AUTHres message (e.g., as defined in IKE protocols) and include, as a payload, the IP address(es) and/or the port(s). Accordingly, the abstraction layer 313 may use the IP address(es) and/or the port(s) to transmit NAS messages to the N3IWF 601 (e.g., via the first virtual interface, the AP 301, and the WiFi modem 305).

As shown in FIG. 6C, the abstraction layer 313 may configure the AP 301 with the IP address(es) (and/or the port(s)) to use for communicating with the N3IWF 601. For example, as shown in connection with reference number 646, the cellular modem 307 and the AP 301 may establish a second virtual interface (e.g., "reverse rmnet1" as shown in example 600). For example, the abstraction layer 313 may transmit, and the AP 301 may receive, an indication that the second virtual interface is connected. For example, the indication may include a QMI_WDS_REVERSE_IP_TRANSPORT_CONNECTION_IND message. In some aspects, the QMI_WDS_REVERSE_IP_TRANSPORT_CONNECTION_IND message may include a status indicator that represents a connected status for the second virtual interface.

As shown in connection with reference number 648, the AP 301 may transmit, and the abstraction layer 313 may receive, a request for one or more configurations for establishing an IPsec with the N3IWF 601. For example, the indication may include a QMI_WDS_GET_IPSEC_STATIC_SA_CONFIG message. In some aspects, the configuration(s) may include an indicator of an encryption method, an IKE key (e.g., as described above in connection with reference number 634), one or more IP addresses (e.g., an IPv4 address, an IPv6 address, and/or another IP address) associated with the N3IWF 601, one or more ports (e.g., a TCP port) associated with the N3IWF 601, an inner address associated with the AP 301 (e.g., a local port), a local address associated with the AP 301 (e.g., one or more IP addresses as described above in connection with reference number 642). Accordingly, as shown in connection with reference number 650, the abstraction layer 313 may transmit, and the AP 301 may receive, the configuration(s). For example, the abstraction layer 313 may provide the configuration(s) in a QMI_WDS_GET_IPSEC_STATIC_SA_CONFIG_RESP message.

As shown in connection with reference number 652, the AP 301 may indicate, to the abstraction layer 313, that an IPsec with the N3IWF 601 has been established via the second virtual interface and the WiFi modem 305. For example, the indication may include a QMI_WDS_REVERSE_IP_TRANSPORT_CONFIG_COMPLETE_REQ message.

By using techniques as described in connection with FIGS. 6A-6C, the AP 301 and the cellular modem 307 may cooperate to establish a control plane with the N3IWF 601. Accordingly, the cellular modem 307 may perform NAS signaling with the N3IWF 601 using the control plane (e.g., as described below in connection with FIG. 7).

As indicated above, FIGS. 6A-6C are provided as an example. Other examples may differ from what is described with regard to FIGS. 6A-6C.

Figure 7:
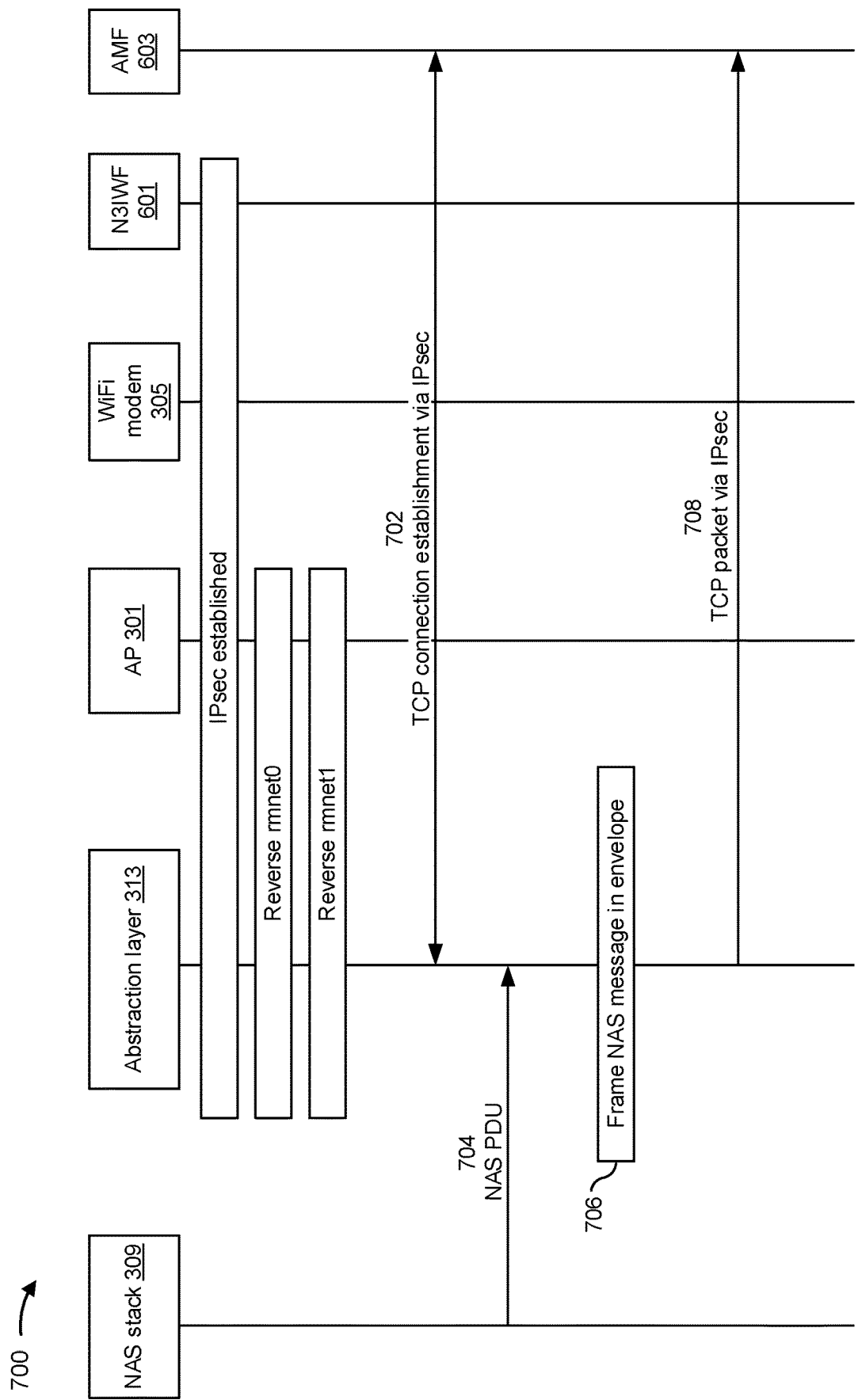
FIG. 7 is a diagram illustrating an example associated with NAS signaling over an N3IWF, in accordance with the present disclosure.

FIG. 7 is a diagram illustrating an example 700 associated with NAS signaling over an N3IWF, in accordance with the present disclosure. Example 700 may be implemented by a UE 120 with an applications processor (e.g., an AP 301) in communication with a WiFi modem 305 and a cellular modem 307 (e.g., including an NAS stack 309 and an abstraction layer 313). As shown in FIG. 7, the abstraction layer 313 may use the WiFi modem 305 to communicate with an N3IWF 601 in order to access an AMF 603 of a core network.

As shown in FIG. 7, the abstraction layer 313 may have an IPsec tunnel established with the N3IWF 601 (e.g., as described above in connection with FIGS. 6A-6C). Additionally, the abstraction layer 313 may use a first virtual interface ("reverse rmnet0" in example 700) with the AP 301 to establish the IPsec tunnel and use a second virtual interface ("reverse rmnet1" in example 700) to perform NAS signaling, as described below.

As shown in connection with reference number 702, the abstraction layer 313 may form a TCP connection with the AMF 603 using the IPsec tunnel (e.g., via the second virtual interface, the AP 301, the WiFi modem 305, and the N3IWF 601). For example, the abstraction layer 313 may transmit an SYN, the AMF 603 may transmit an SYN-ACK, and the abstraction layer 313 may transmit an ACK (e.g., as defined in TCP protocols).

As shown in connection with reference number 704, the NAS stack 309 may generate at least one PDU including an NAS message. For example, the NAS message may include information used by the AMF 603 to track a location of the UE 120 and perform handover as the UE 120 moves between cells. Accordingly, as shown in connection with reference number 706, the abstraction layer 313 may encode the at least one PDU using TCP. As described above, encoding the PDU(s) using TCP may include one or more of dividing the NAS message into one or more TCP segments (also referred to as "TCP PDUs"), adding one or more corresponding TCP headers to the TCP segment(s), and/or encapsulating the TCP segment(s) in one or more IP datagrams with the corresponding TCP header(s). As shown in connection with reference number 708, the abstraction layer 313 may transmit, and the AMF 603 may receive, the NAS message (e.g., via the second virtual interface, the AP 301, the WiFi modem 305, and the N3IWF 601). For example, the AP 301 may receive the NAS message as at least one TCP PDUs from the cellular modem 307.

By using techniques as described in connection with FIG. 7, the AP 301 and the cellular modem 307 may cooperate to perform NAS signaling with the N3IWF 601. As a result, the AMF 603 may perform proper handover of the UE 120 as the UE 120 moves between cells, which results in increased throughput as compared with the AMF 603 being unable to perform handover.

As indicated above, FIG. 7 is provided as an example. Other examples may differ from what is described with regard to FIG. 7.

Figure 8A:
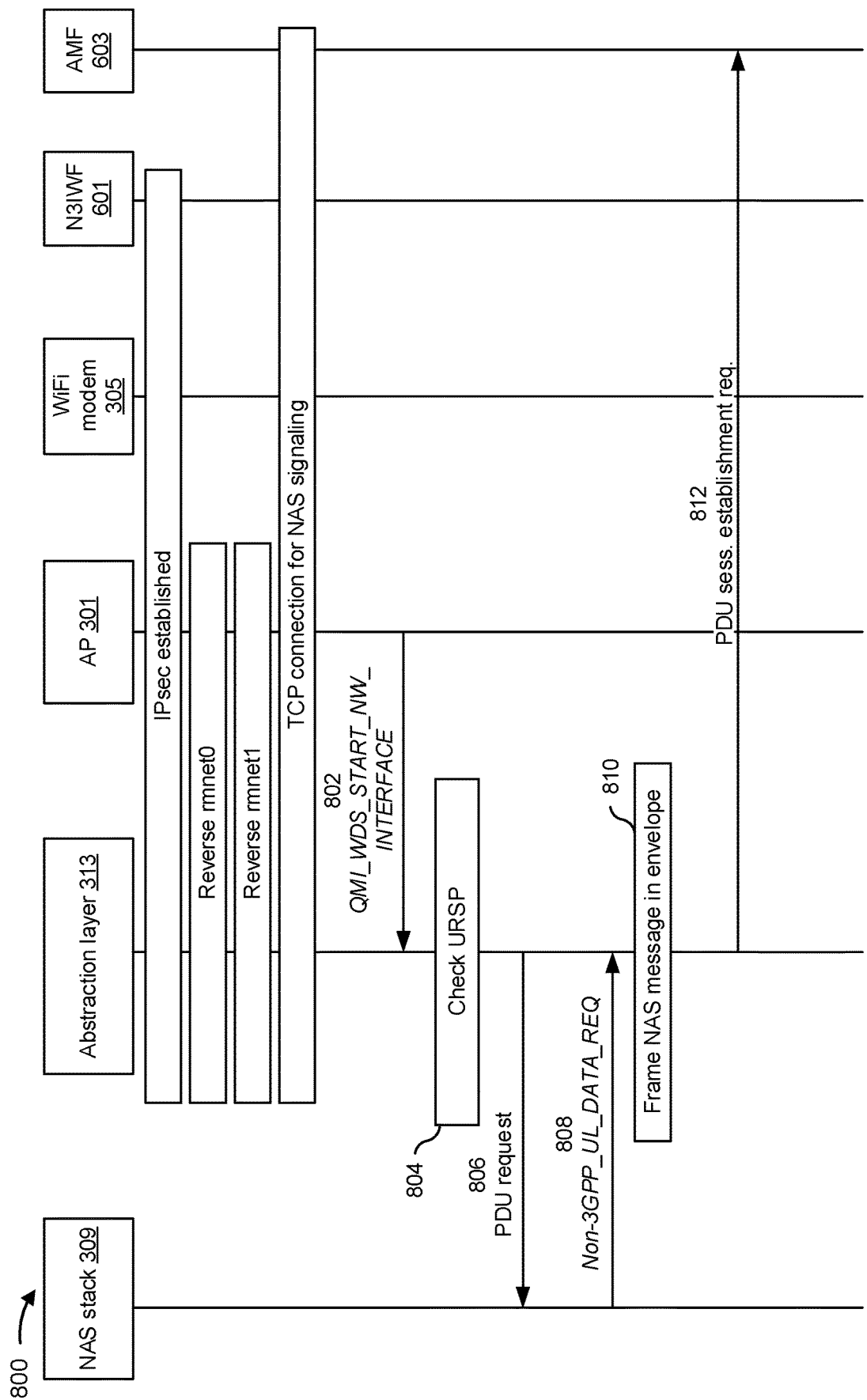
FIGS. 8A and 8B are diagrams illustrating an example associated with establishing a user plane with an N3IWF, in accordance with the present disclosure.
Figure 8B:
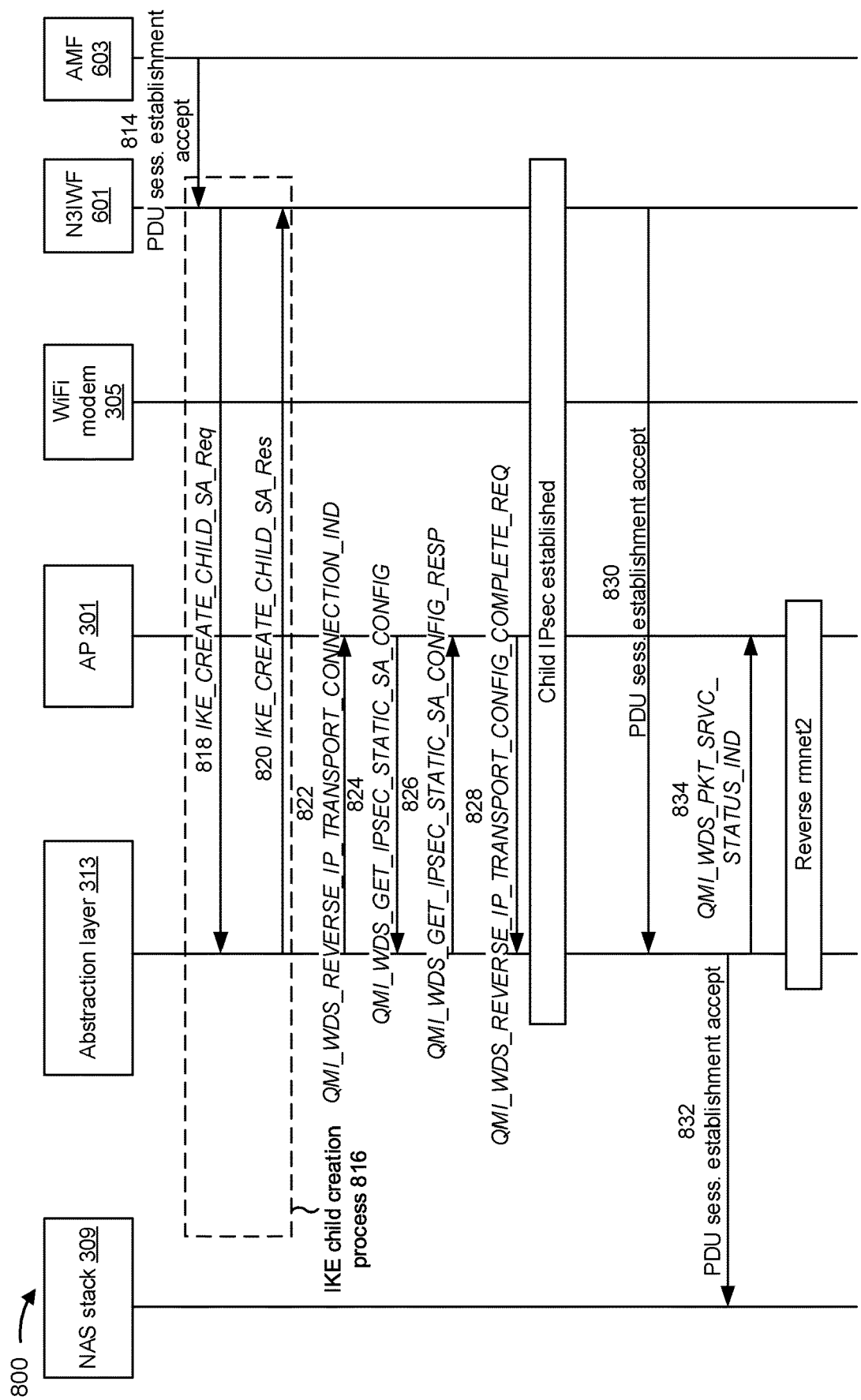

FIGS. 8A and 8B are diagrams illustrating an example 800 associated with establishing a user plane with an N3IWF, in accordance with the present disclosure. Example 800 may be implemented by a UE 120 with an applications processor (e.g., an AP 301) in communication with a WiFi modem 305 and a cellular modem 307 (e.g., including an NAS stack 309 and an abstraction layer 313). As shown in FIGS. 8A-8B, the abstraction layer 313 may use the WiFi modem 305 to communicate with an N3IWF 601 in order to access an AMF 603 of a core network.

As shown in FIG. 8A, the abstraction layer 313 may have an IPsec tunnel established with the N3IWF 601 (e.g., as described above in connection with FIGS. 6A-6C). Additionally, the abstraction layer 313 may use a first virtual interface ("reverse rmnet0" in example 800) with the AP 301 to establish the IPsec tunnel and use a second virtual interface ("reverse rmnet1" in example 800) to perform NAS signaling, as described below. Additionally, in some aspects, the abstraction layer 313 may have a TCP connection with the AMF 603 via the IPsec tunnel (e.g., as described above in connection with FIG. 7).

As shown in FIG. 8A and in connection with reference number 802, the AP 301 may transmit, and the cellular modem 307 may receive, an indication to initiate a non-3GPP user plane. For example, the indication may include a QMI_WDS_START_NW_INTERFACE message. In some aspects, the QMI_WDS_START_NW_INTERFACE message may include an indication of an APN that is associated with non-3GPP data signaling (e.g., a variable representing APN may be set to Internet).

As shown in connection with reference number 804, the abstraction layer 313 may check a URSP 315 and/or another policy associated with the UE 120. For example, the URSP 315 may include one or more rules that accept, as input, one or more properties associated with the APN and that output an indicator of whether to use the APN for data exchange. Accordingly, as shown in connection with reference number 806, the abstraction layer 313 may transmit, and the NAS stack 309 may receive, a request (e.g., a request to transmit PDUs using the WiFi modem 305) based at least in part on the URSP 315. Accordingly, as shown in connection with reference number 808, the NAS stack 309 may transmit, and the abstraction layer 313 may receive, a PDU including a session establishment request for the user plane. For example, the PDU may include a Non-3GPP_UL_DATA_REQ message (e.g., when the AP 301 has uplink data to transmit) and/or a Non-3GPP_DL_DATA_REQ message (e.g., when the AP 301 has downlink data to receive).

As shown in connection with reference number 810, the abstraction layer 313 may encode the PDU using TCP. For example, the abstraction layer 313 may frame the session establishment request in a TCP/IP envelope. As shown in connection with reference number 812, the abstraction layer 313 may transmit, and the AMF 603 may receive, the session establishment request (e.g., via the second virtual interface, the AP 301, the WiFi modem 305, and the N3IWF 601).

As shown in FIG. 8B and in connection with reference number 814, the AMF 603 may transmit, and the N3IWF 601 may receive, a PDU including a session establishment accept for the user plane. Accordingly, the N3IWF 601 and the abstraction layer 313 may perform an IKE child creation process as shown in connection with reference number 816. For example, as shown in connection with reference number 818, the N3IWF 601 may transmit, and the abstraction layer 313 may receive (e.g., via the WiFi modem 305, the AP 301, and the first virtual interface), a child request message. For example, the N3IWF 601 may use an IKE_CREATE_CHILD_SA_Req message (e.g., as defined in IKE protocols). Accordingly, as shown in connection with reference number 820, the abstraction layer 313 may transmit, and the N3IWF 601 may receive (e.g., via the first virtual interface, the AP 301, and the WiFi modem 305), a confirmation of the child request. For example, the confirmation may include an IKE_CREATE_CHILD_SA_Res message (e.g., as defined in IKE protocols).

The abstraction layer 313 may configure the AP 301 with IP address(es) (and/or port(s)) to use for the user plane. For example, as shown in connection with reference number 822, the cellular modem 307 and the AP 301 may establish a third virtual interface (e.g., "reverse rmnet2" as shown in example 800). For example, the abstraction layer 313 may transmit, and the AP 301 may receive, an indication that the third virtual interface is connected. For example, the indication may include a QMI_WDS_REVERSE_IP_TRANSPORT_CONNECTION_IND message. In some aspects, the QMI_WDS_REVERSE_IP_TRANSPORT_CONNECTION_IND message may include a status indicator that represents a connected status for the third virtual interface.

As shown in connection with reference number 824, the AP 301 may transmit, and the abstraction layer 313 may receive, a request for one or more configurations for establishing a child IPsec with the N3IWF 601. For example, the indication may include a QMI_WDS_GET_IPSEC_STATIC_SA_CONFIG message. In some aspects, the configuration(s) may include an indicator of an encryption method, an IKE key (e.g., generated during the process described above in connection with reference number 816), one or more IP addresses (e.g., an IPv4 address, an IPv6 address, and/or another IP address) associated with the user plane, one or more ports (e.g., a TCP port) associated with the user plane, an inner address associated with the AP 301 and the user plane (e.g., a local port), a local address associated with the AP 301 and the user plane. Accordingly, as shown in connection with reference number 826, the abstraction layer 313 may transmit, and the AP 301 may receive, the configuration(s). For example, the abstraction layer 313 may provide the configuration(s) in a QMI_WDS_GET_IPSEC_STATIC_SA_CONFIG_RESP message.

As shown in connection with reference number 828, the AP 301 may indicate, to the abstraction layer 313, that a child IPsec with the N3IWF 601 has been established via the third virtual interface and the WiFi modem 305. For example, the indication may include a QMI_WDS_REVERSE_IP_TRANSPORT_CONFIG_COMPLETE_REQ message.

Accordingly, as shown in connection with reference number 830, the N3IWF 601 may transmit, and the abstraction layer 313 may receive (e.g., via the WiFi modem 305, the AP 301, and the third virtual interface), a PDU including a session establishment accept for the user plane from the AMF 603. As shown in connection with reference number 832, the abstraction layer 313 may pass this PDU to the NAS stack 309. Additionally, in some aspects and as shown in connection with reference number 834, the abstraction layer 313 may transmit, and the AP 301 may receive, an indication that the user plane is established. For example, the indication may include a QMI_WDS_PKT_SRVC_STATUS_IND message. Accordingly, the abstraction layer 313 may encode PDUs that include data using TCP and transmit the data to the N3IWF 601 on the user plane via the third virtual interface, the AP 301, and the WiFi modem 305. As described above, encoding the data using TCP may include one or more of dividing data into one or more TCP segments, adding one or more corresponding TCP headers to the TCP segment(s), and/or encapsulating the TCP segment(s) in one or more IP datagrams with the corresponding TCP header(s). Similarly, the abstraction layer 313 may receive, from the N3IWF 601, PDUs that include data on the user plane via the WiFi modem 305, the AP 301, and the third virtual interface.

By using techniques as described in connection with FIGS. 8A-8B, the AP 301 and the cellular modem 307 may cooperate to establish a user plane with the N3IWF 601. As a result, throughput to the UE 120 is increased, which reduces latency and causes the UE 120 to conserve power and processing resources.

As indicated above, FIGS. 8A-8B are provided as an example. Other examples may differ from what is described with regard to FIGS. 8A-8B.

Figure 9A:
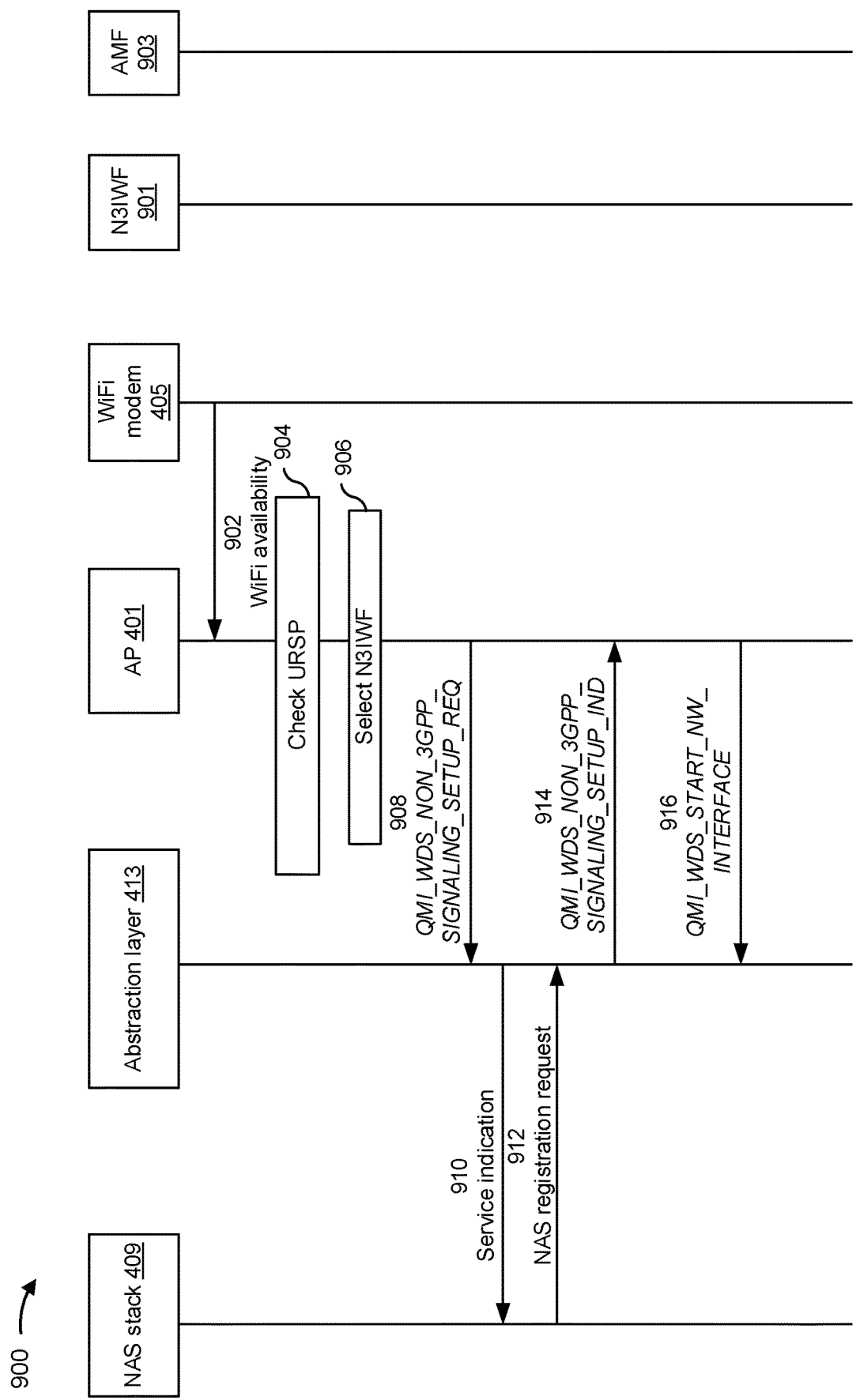
FIGS. 9A, 9B, and 9C are diagrams illustrating another example associated with establishing a control plane with an N3IWF, in accordance with the present disclosure.
Figure 9B:
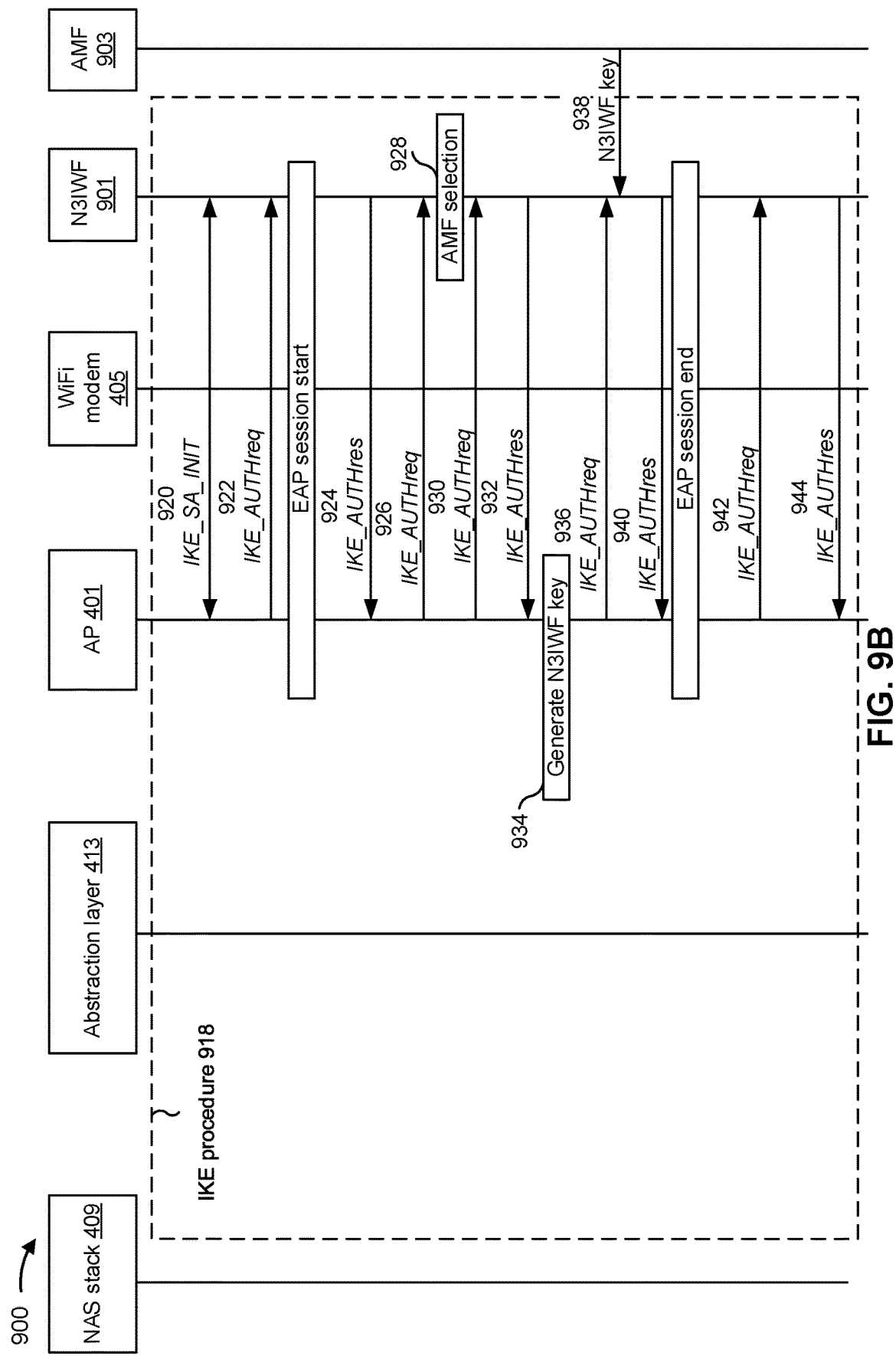
Figure 9C:
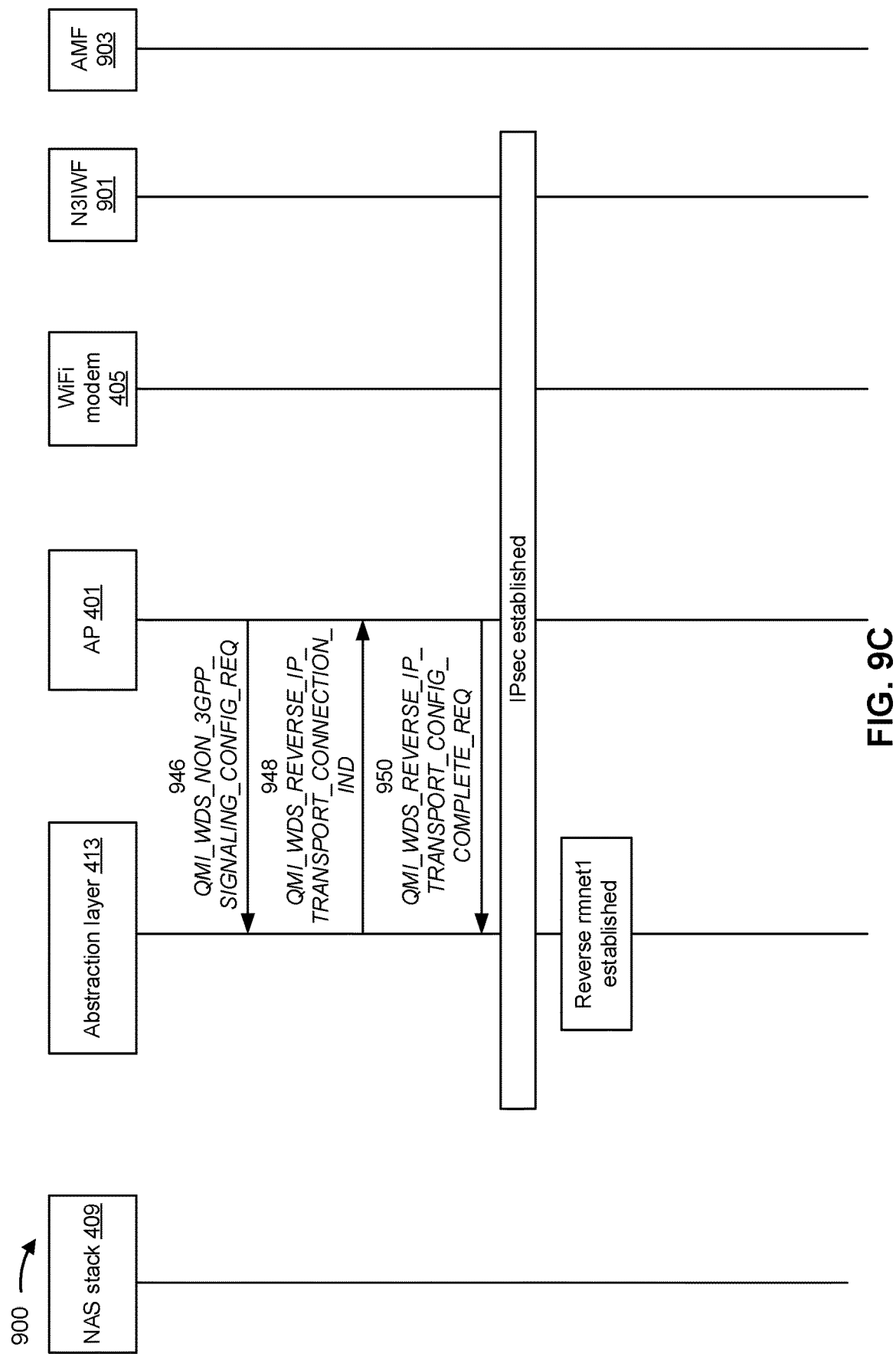

FIGS. 9A, 9B, and 9C are diagrams illustrating an example 900 associated with establishing a control plane with an N3IWF, in accordance with the present disclosure. Example 900 may be implemented by a UE 120 with an applications processor (e.g., an AP 401) in communication with a WiFi modem 405 and a cellular modem 407 (e.g., including an NAS stack 409 and an abstraction layer 413). As shown in FIGS. 9A-9C, the abstraction layer 413 may use the WiFi modem 405 to communicate with an N3IWF 901 in order to access an AMF 903 of a core network.

As shown in FIG. 9A and in connection with reference number 902, the WiFi modem 405 may transmit, and the AP 401 may receive, an indicator that a non-3GPP network (e.g., a WiFi network and/or other WLAN) is available to use. For example, the WiFi modem 405 may perform a scan of an environment of the UE 120 and determine that at least one WiFi network is available for the UE 120 to use (e.g., either because the WiFi network is public or because the UE 120 has credentials stored such that the UE 120 may access the WiFi network).

As shown in connection with reference number 904, the AP 401 may check a URSP 415 and/or another policy associated with the UE 120. For example, the URSP 415 may include one or more rules that accept one or more properties associated with the available WiFi network as input and output an indicator of whether to use the available WiFi network for NAS signaling. Accordingly, as shown in connection with reference number 906, the AP 401 may select the N3IWF 901 based at least in part on the policy associated with the UE 120.

As shown in connection with reference number 908, the AP 401 may transmit, and the abstraction layer 413 may receive, a request to use the N3IWF 901 for NAS signaling. For example, as shown in FIG. 9A, the indication may include a QMI_WDS_NON_3GPP_SIGNALING_SETUP_REQ message. The AP 401 may pass the indicator to the abstraction layer 413 using an RIL between the AP 401 and the cellular modem 407.

As shown in connection with reference number 910, the abstraction layer 413 may transmit, and the NAS stack 409 may receive, a service indication, associated with the non-3GPP network (e.g., the available WiFi network). Accordingly, as shown in connection with reference number 912, the NAS stack 409 may generate and transmit, and the abstraction layer 413 may receive, a NAS registration request. For example, the NAS stack 409 may generate the NAS registration request based at least in part on the service indication. The NAS registration request may be generated according to 3GPP specifications and/or another similar standard.

As shown in connection with reference number 914, the abstraction layer 413 may transmit, and the AP 401 may receive, an indication to use the N3IWF 901 for NAS signaling. For example, as shown in FIG. 9A, the indication may include a QMI_WDS_NON_3GPP_SIGNALING_SETUP_IND message. Accordingly, an HLOS supported by the AP 401 may determine that the cellular modem 407 is ready to perform NAS signaling over the available WiFi network based at least in part on the indication. The indication may include an identifier associated with the UE 120 (e.g., a UE ID as defined in 3GPP specifications). Additionally, the indication may include a NAS payload that the AP 401 may use to establish a NAS interface with the N3IWF 901.

As shown in connection with reference number 916, the AP 401 may transmit, and the abstraction layer 413 may receive, a confirmation of the NAS payload. For example, the indication may include a QMI_WDS_START_NW_INTERFACE message. In some aspects, the QMI_WDS_START_NW_INTERFACE message may include an indication of an APN that is associated with non-3GPP NAS signaling (e.g., a variable representing APN may be set to non_3gpp_signaling).

Accordingly, as shown in FIG. 9B and in connection with reference number 918, the AP 401 may perform an IKE procedure with a core network using the N3IWF 901. For example, as shown in connection with reference number 920, the AP 401 may exchange, with the N3IWF 901 (e.g., via the WiFi modem 405), an initial IKE key. For example, the initial IKE exchange may include an IKE_SA_INIT exchange (e.g., as defined in IKE protocols). As shown in connection with reference number 922, the AP 401 may authenticate itself with the N3IWF 901 (e.g., via the WiFi modem 405). For example, the AP 401 may use an IKE_AUTHreq function (e.g., as defined in IKE protocols) with an identifier associated with the UE 120 (e.g., an ISAKMP ID). The AP 401 may additionally provide a payload used to authenticate the UE 120. In example 900, the payload is associated with an EAP; however, other payloads, such as a payload associated with a PSK, a payload associated with RSA-SIG, or a payload associated with ECDSA-SIG may be additionally or alternatively used. As further shown in connection with reference number 924, the N3IWF 901 may transmit, and the AP 401 may receive (e.g., via the WiFi modem 405), a confirmation of the authentication. For example, the confirmation may include an IKE_AUTHres message (e.g., as defined in IKE protocols).

As shown in connection with reference number 926, the AP 401 may request NAS registration with the N3IWF 901 (e.g., via the WiFi modem 405). For example, the AP 401 may use an IKE_AUTHreq function (e.g., as defined in IKE protocols) and include, as a payload, a PDU encapsulating the NAS payload that was received from the abstraction layer 413 (e.g., in the QMI_WDS_NON_3GPP_SIGNALING_SETUP_IND message). Accordingly, as shown in connection with reference number 928, the N3IWF 901 may select an AMF of the core network to associate with the UE 120. For example, the N3IWF 901 may select the AMF 903 based at least in part on the NAS payload.

As shown in connection with reference number 930, the AP 401 may again authenticate itself with the N3IWF 901 (e.g., via the WiFi modem 405). For example, the AP 401 may use an IKE_AUTHreq function (e.g., as defined in IKE protocols). As further shown in connection with reference number 932, the N3IWF 901 may transmit, and the AP 401 may receive (e.g., via the WiFi modem 305), a confirmation of the authentication. For example, the confirmation may include an IKE_AUTHres message (e.g., as defined in IKE protocols). Accordingly, as shown in connection with reference number 934, the AP 401 may generate an IKE key associated with the N3IWF 901. For example, the IKE key may be associated with an asymmetric encryption algorithm that the AP 401 may use to securely transmit NAS signals to the N3IWF 901.

As shown in connection with reference number 936, the AP 401 may authenticate itself with the N3IWF 901 (e.g., via the WiFi modem 405) in order to terminate the EAP session (and/or other secure session, as described above). For example, the AP 401 may use an IKE_AUTHreq function (e.g., as defined in IKE protocols) and include, as a payload, a PDU encapsulating an indicator that NAS setup is complete (e.g., an NAS SMC Complete message as defined in 3GPP specifications and/or another standard). Additionally, and as shown in connection with reference number 938, the selected AMF 903 may provide the N3IWF 901 with an IKE key associated with the N3IWF 901. For example, the IKE key may be associated with an asymmetric encryption algorithm that the N3IWF 901 may use to securely transmit NAS signals to the AP 401.

As further shown in connection with reference number 940, the N3IWF 901 may transmit, and the AP 401 may receive (e.g., via the WiFi modem 305), a confirmation of the authentication. For example, the confirmation may include an IKE_AUTHres message (e.g., as defined in IKE protocols).

As shown in connection with reference number 942, the AP 401 may provide the N3IWF 601 (e.g., via the WiFi modem 405) with one or more IP addresses (e.g., an IPv4 address, an IPv6 address, and/or another IP address) associated with the AP 401. For example, the AP 401 may use an IKE_AUTHreq function (e.g., as defined in IKE protocols) and include, as a payload, the IP address(es). Accordingly, the N3IWF 901 may use the IP address(es) to transmit NAS messages to the AP 401 (e.g., via the WiFi modem 405). Similarly, and as shown in connection with reference number 944, the N3IWF 901 may transmit, and the AP 401 may receive (e.g., via the WiFi modem 405), one or more IP addresses (e.g., an IPv4 address, an IPv6 address, and/or another IP address) and/or one or more ports (e.g., a TCP port) associated with the N3IWF 901. For example, the N3IWF 601 may use an IKE_AUTHres message (e.g., as defined in IKE protocols) and include, as a payload, the IP address(es) and/or the port(s). Accordingly, the AP 401 may use the IP address(es) and/or the port(s) to transmit NAS messages to the N3IWF 901 (e.g., via the WiFi modem 305).

As shown in FIG. 9C and in connection with reference number 946, the AP 401 may inform the abstraction layer 413 regarding the IP address(es) (and/or the port(s)) to use for communicating with the N3IWF 901. For example, the AP 401 may provide the IP address(es) and/or the port(s) in a QMI_WDS_NON_3GPP_SIGNALING_CONFIG_REQ message.

As shown in connection with reference number 948, the cellular modem 407 and the AP 401 may establish a first virtual interface (e.g., "reverse rmnet1" as shown in example 900). For example, the abstraction layer 413 may transmit, and the AP 401 may receive, an indication that the first virtual interface is connected. For example, the indication may include a QMI_WDS_REVERSE_IP_TRANSPORT_CONNECTION_IND message. In some aspects, the QMI_WDS_REVERSE_IP_TRANSPORT_CONNECTION_IND message may include a status indicator that represents a connected status for the first virtual interface.

As shown in connection with reference number 950, the AP 401 may indicate, to the abstraction layer 413, that an IPsec with the N3IWF 901 has been established via the first virtual interface and the WiFi modem 405. For example, the indication may include a QMI_WDS_REVERSE_IP_TRANSPORT_CONFIG_COMPLETE_REQ message.

By using techniques as described in connection with FIGS. 9A-9C, the AP 401 and the cellular modem 407 may cooperate to establish a control plane with the N3IWF 901. Accordingly, the cellular modem 407 may perform NAS signaling with the N3IWF 901 using the control plane (e.g., as described below in connection with FIG. 10).

As indicated above, FIGS. 9A-9C are provided as an example. Other examples may differ from what is described with regard to FIGS. 9A-9C.

Figure 10:
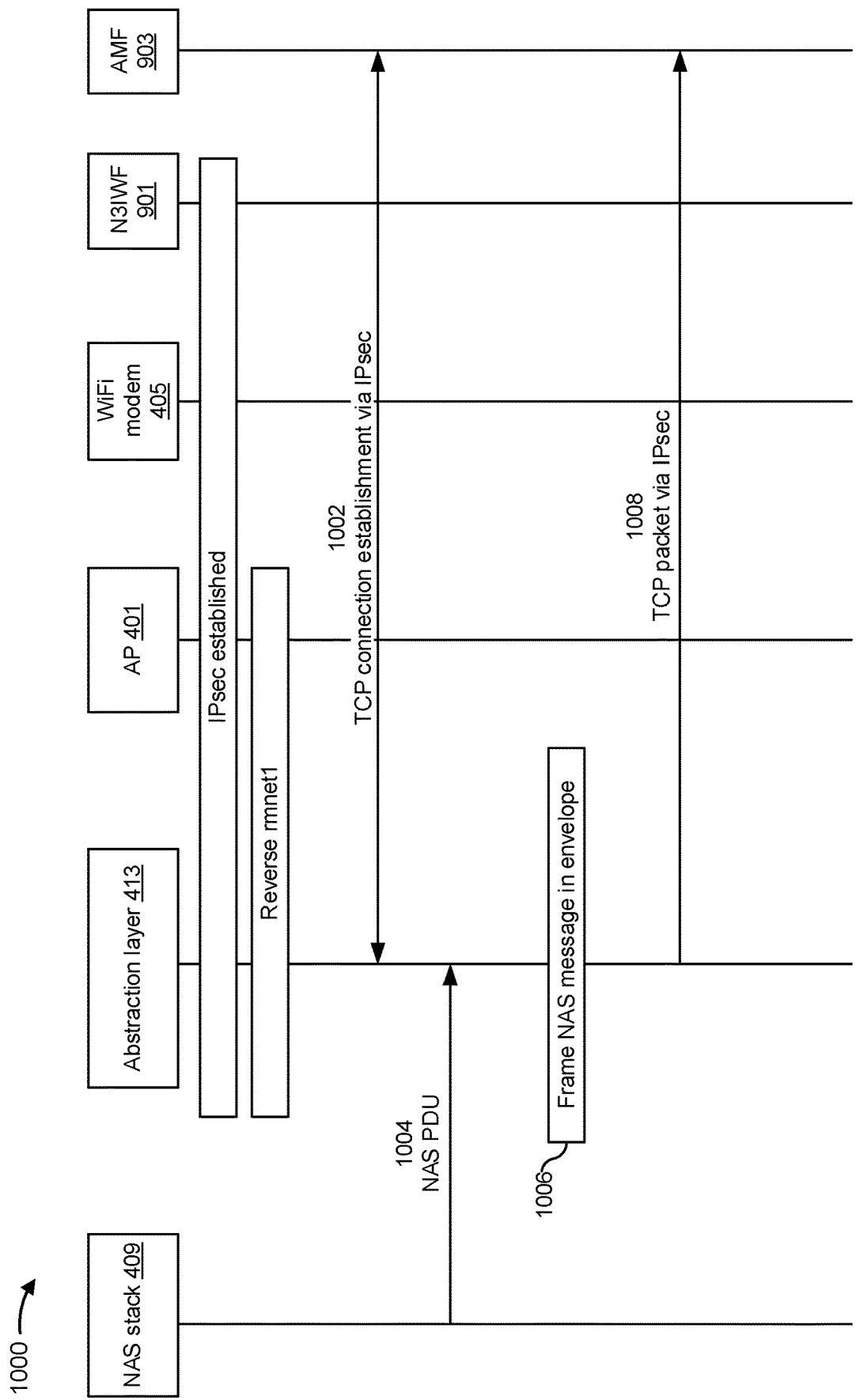
FIG. 10 is a diagram illustrating another example associated with NAS signaling over an N3IWF, in accordance with the present disclosure.

FIG. 10 is a diagram illustrating an example 1000 associated with NAS signaling over an N3IWF, in accordance with the present disclosure. Example 1000 may be implemented by a UE 120 with an applications processor (e.g., an AP 401) in communication with a WiFi modem 405 and a cellular modem 407 (e.g., including an NAS stack 409 and an abstraction layer 413). As shown in FIG. 10, the abstraction layer 413 may use the WiFi modem 405 to communicate with an N3IWF 901 in order to access an AMF 903 of a core network.

As shown in FIG. 10, the abstraction layer 413 may have an IPsec tunnel established with the N3IWF 901 (e.g., as described above in connection with FIGS. 9A-9C). Additionally, the abstraction layer 413 may use a first virtual interface ("reverse rmnet1" in example 1000) to perform NAS signaling, as described below.

As shown in connection with reference number 1002, the abstraction layer 413 may form a TCP connection with the AMF 903 using the IPsec tunnel (e.g., via the first virtual interface, the AP 401, the WiFi modem 405, and the N3IWF 901). For example, the abstraction layer 413 may transmit an SYN, the AMF 903 may transmit an SYN-ACK, and the abstraction layer 413 may transmit an ACK (e.g., as defined in TCP protocols).

As shown in connection with reference number 1004, the NAS stack 409 may generate a PDU including an NAS message. For example, the NAS message may include information used by the AMF 903 to track a location of the UE 120 and perform handover as the UE 120 moves between cells. Accordingly, as shown in connection with reference number 1006, the abstraction layer 413 may encode the PDU using TCP. For example, the abstraction layer 413 may frame the NAS message in a TCP/IP envelope. As described above, encoding the PDU(s) using TCP may include one or more of dividing the NAS message into one or more TCP segments, adding one or more corresponding TCP headers to the TCP segment(s), and/or encapsulating the TCP segment(s) in one or more IP datagrams with the corresponding TCP header(s). As shown in connection with reference number 1008, the abstraction layer 413 may transmit, and the AMF 903 may receive, the NAS message (e.g., via the first virtual interface, the AP 401, the WiFi modem 405, and the N3IWF 901).

By using techniques as described in connection with FIG. 10, the AP 401 and the cellular modem 407 may cooperate to perform NAS signaling with the N3IWF 901. As a result, the AMF 903 may perform proper handover of the UE 120 as the UE 120 moves between cells, which results in increased throughput as compared with the AMF 903 being unable to perform handover.

As indicated above, FIG. 10 is provided as an example. Other examples may differ from what is described with regard to FIG. 10.

Figure 11A:
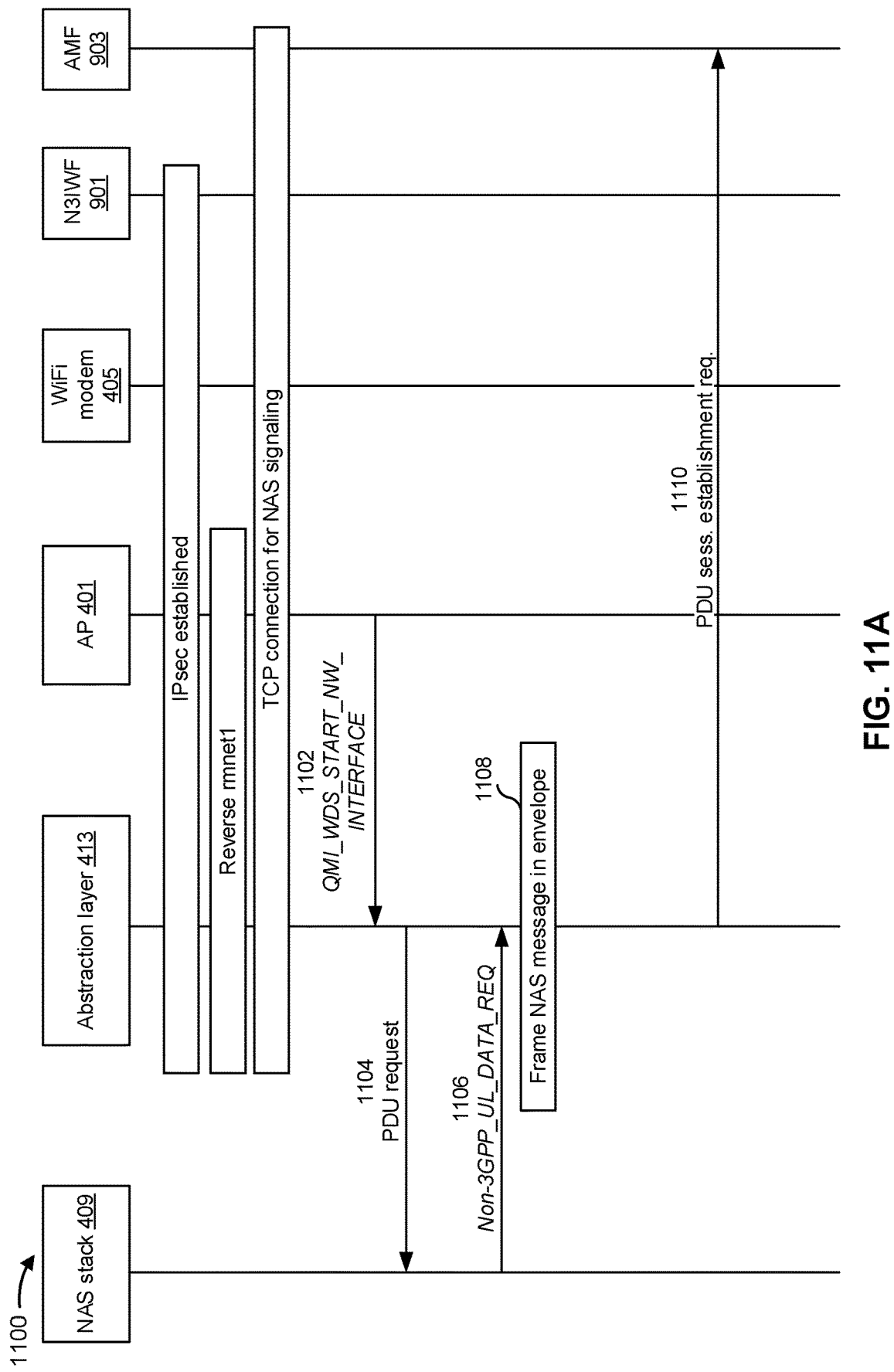
FIGS. 11A and 11B are diagrams illustrating another example associated with establishing a user plane with an N3IWF, in accordance with the present disclosure.
Figure 11B:
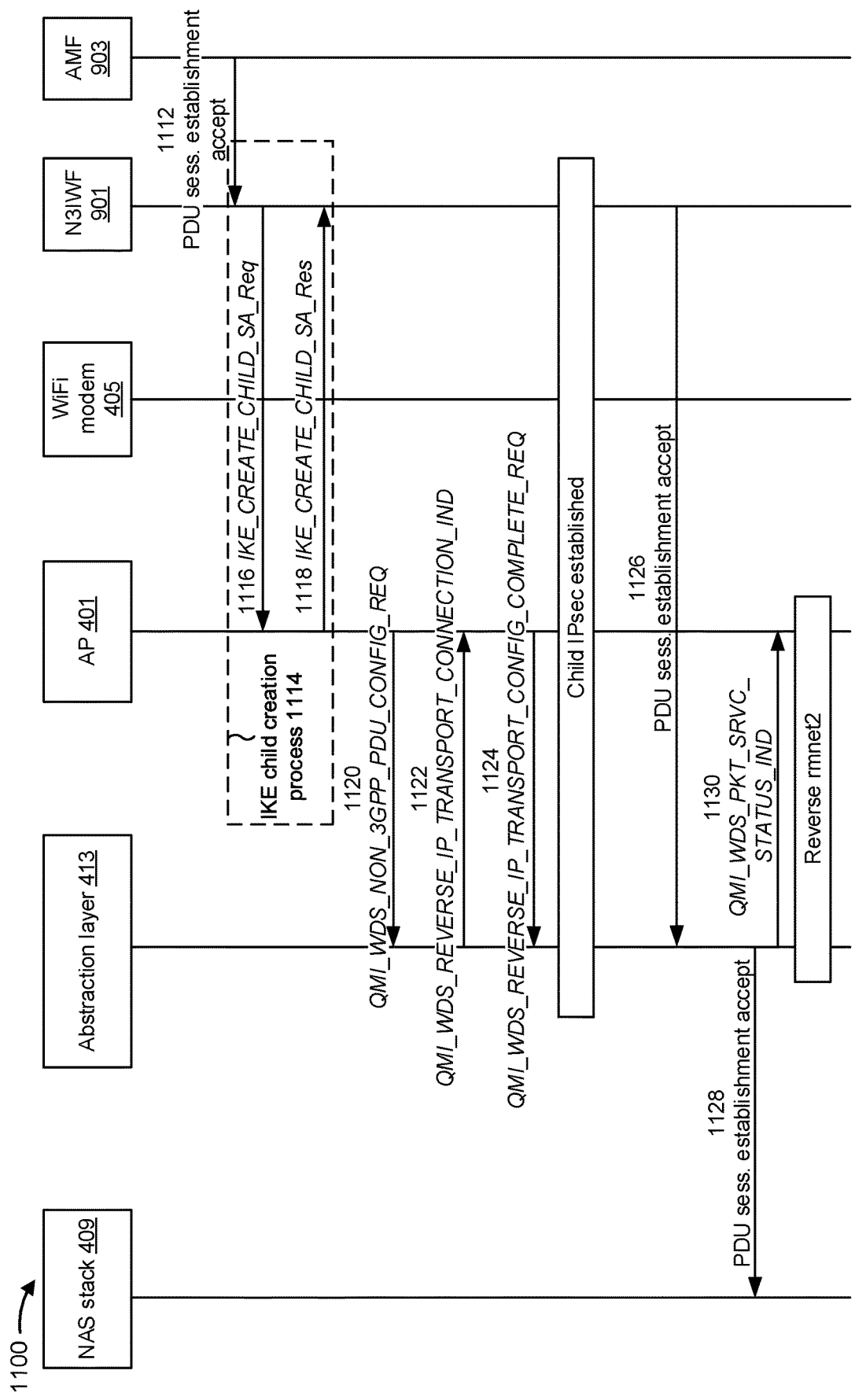

FIGS. 11A and 11B are diagrams illustrating an example 1100 associated with establishing a user plane with an N3IWF, in accordance with the present disclosure. Example 1100 may be implemented by a UE 120 with an applications processor (e.g., an AP 401) in communication with a WiFi modem 405 and a cellular modem 407 (e.g., including an NAS stack 409 and an abstraction layer 413). As shown in FIGS. 11A-11B, the abstraction layer 413 may use the WiFi modem 405 to communicate with an N3IWF 901 in order to access an AMF 903 of a core network.

As shown in FIG. 11A, the abstraction layer 413 may have an IPsec tunnel established with the N3IWF 901 (e.g., as described above in connection with FIGS. 8A-8C). Additionally, the abstraction layer 413 may use a first virtual interface ("reverse rmnet1" in example 1100) to perform NAS signaling, as described below. Additionally, in some aspects, the abstraction layer 413 may have a TCP connection with the AMF 903 via the IPsec tunnel (e.g., as described above in connection with FIG. 10).

As shown in FIG. 11A and in connection with reference number 1102, the AP 401 may transmit, and the cellular modem 407 may receive, an indication to initiate a non-3GPP user plane. For example, the indication may include a QMI_WDS_START_NW_INTERFACE message. In some aspects, the QMI_WDS_START_NW_INTERFACE message may include an indication of an APN that is associated with non-3GPP data signaling (e.g., a variable representing APN may be set to Internet).

As shown in connection with reference number 1104, the abstraction layer 413 may transmit, and the NAS stack 409 may receive, a request (e.g., a request to transmit PDUs using the WiFi modem 405). Accordingly, as shown in connection with reference number 1106, the NAS stack 409 may transmit, and the abstraction layer 413 may receive, a PDU including a session establishment request for the user plane. For example, the PDU may include a Non-3GPP_ UL_DATA_REQ message (e.g., when the AP 401 has uplink data to transmit) and/or a Non-3GPP_DL_DATA_REQ message (e.g., when the AP 401 has downlink data to receive).

As shown in connection with reference number 1108, the abstraction layer 413 may encode the PDU using TCP. For example, the abstraction layer 413 may frame the session establishment request in a TCP/IP envelope. As shown in connection with reference number 1110, the abstraction layer 413 may transmit, and the AMF 903 may receive, the session establishment request (e.g., via the first virtual interface, the AP 401, the WiFi modem 405, and the N3IWF 901).

As shown in FIG. 11B and in connection with reference number 1112, the AMF 903 may transmit, and the N3IWF 901 may receive, a PDU including a session establishment accept for the user plane. Accordingly, the N3IWF 901 and the AP 401 may perform an IKE child creation process as shown in connection with reference number 1114. For example, as shown in connection with reference number 1116, the N3IWF 901 may transmit, and the AP 401 may receive (e.g., via the WiFi modem 405), a child request message. For example, the N3IWF 901 may use an IKE_CREATE_CHILD_SA_Req message (e.g., as defined in IKE protocols). Accordingly, as shown in connection with reference number 1118, the AP 401 may transmit, and the N3IWF 901 may receive (e.g., via the WiFi modem 405), a confirmation of the child request. For example, the confirmation may include an IKE_CREATE_CHILD_SA_Res message (e.g., as defined in IKE protocols).

As shown in connection with reference number 1120, AP 401 may provide the abstraction layer 413 with IP address(es) (and/or port(s)) to use for the user plane. For example, as shown in connection with reference number 1120. For example, the AP 401 may provide the IP address(es) and/or the port(s) in a QMI_WDS_NON_3GPP_PDU_CONFIG_REQ message.

As shown in connection with reference number 1122, the cellular modem 407 and the AP 401 may establish a second virtual interface (e.g., "reverse rmnet2" as shown in example 1100). For example, the abstraction layer 413 may transmit, and the AP 401 may receive, an indication that the first virtual interface is connected. For example, the indication may include a QMI_WDS_REVERSE_IP_ TRANSPORT_CONNECTION_IND message. In some aspects, the QMI_WDS_REVERSE_IP_TRANSPORT_ CONNECTION_IND message may include a status indicator that represents a connected status for the first virtual interface.

As shown in connection with reference number 1124, the AP 401 may indicate, to the abstraction layer 413, that an IPsec with the N3IWF 901 has been established via the second virtual interface and the WiFi modem 405. For example, the indication may include a QMI_WDS_REVER- SE_IP_TRANSPORT_CONFIG_COMPLETE_REQ message.

Accordingly, as shown in connection with reference number 1126, the N3IWF 901 may transmit, and the abstraction layer 413 may receive (e.g., via the WiFi modem 405, the AP 401, and the second virtual interface), a PDU including a session establishment accept for the user plane from the AMF 903. As shown in connection with reference number 1128, the abstraction layer 413 may pass this PDU to the NAS stack 409. Additionally, in some aspects and as shown in connection with reference number 1130, the abstraction layer 413 may transmit, and the AP 401 may receive, an indication that the user plane is established. For example, the indication may include a QMI_WDS_PKT_SRVC_STA- TUS_IND message. Accordingly, the abstraction layer 413 may encode PDUs that include data using TCP and transmit the data to the N3IWF 901 on the user plane via the second virtual interface, the AP 401, and the WiFi modem 405. As described above, encoding the data using TCP may include one or more of dividing the data into one or more TCP segments, adding one or more corresponding TCP headers to the TCP segment(s), and/or encapsulating the TCP segment(s) in one or more IP datagrams with the corresponding TCP header(s). Similarly, the abstraction layer 413 may receive, from the N3IWF 901, PDUs that include data on the user plane via the WiFi modem 405, the AP 401, and the second virtual interface.

By using techniques as described in connection with FIGS. 11A-11B, the AP 401 and the cellular modem 407 may cooperate to establish a user plane with the N3IWF 901. As a result, throughput to the UE 120 is increased, which reduces latency and causes the UE 120 to conserve power and processing resources.

As indicated above, FIGS. 11A-11B are provided as an example. Other examples may differ from what is described with regard to FIGS. 11A-11B.

Figure 12:
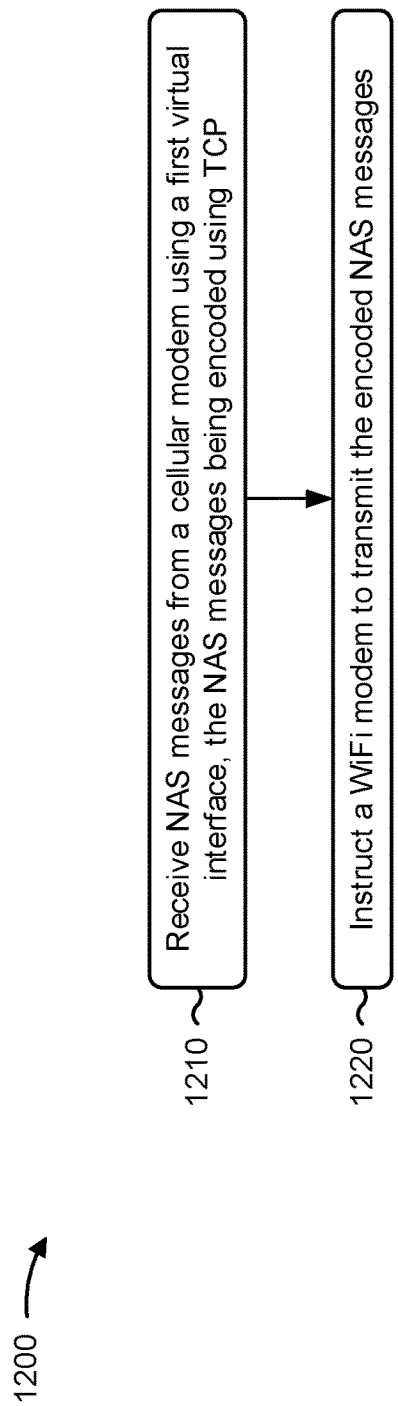
FIGS. 12, 13, 14, and 15 are diagrams illustrating example processes associated with NAS signaling over a non-3GPP network, in accordance with the present disclosure.

FIG. 12 is a diagram illustrating an example process 1200 performed, for example, by an applications processor, in accordance with the present disclosure. Example process 1200 is an example where the applications processor (e.g., applications processor 301 and/or apparatus 1600 of FIG. 16) performs operations associated with NAS signaling over a non-3GPP network.

As shown in FIG. 12, in some aspects, process 1200 may include receiving NAS messages from a cellular modem (e.g., cellular modem 307 and/or apparatus 1700 of FIG. 17) using a first virtual interface (block 1210). For example, the applications processor (e.g., using communication manager 140 and/or reception component 1602, depicted in FIG. 16) may receive NAS messages from a cellular modem using a first virtual interface, as described herein. In some aspects, the NAS messages are encoded using TCP.

As further shown in FIG. 12, in some aspects, process 1200 may include instructing a WiFi modem to transmit the encoded NAS messages (block 1220). For example, the applications processor (e.g., using communication manager 140 and/or transmission component 1604, depicted in FIG. 16) may instruct a WiFi modem to transmit the encoded NAS messages, as described herein.

Process 1200 may include additional aspects, such as any single aspect or any combination of aspects described below and/or in connection with one or more other processes described elsewhere herein.

In a first aspect, process 1200 further includes receiving (e.g., using communication manager 140 and/or reception component 1602), from the cellular modem and using a second virtual interface, data encoded using TCP, and instructing (e.g., using communication manager 140 and/or transmission component 1604) the WiFi modem to transmit the encoded data.

Figure 16:
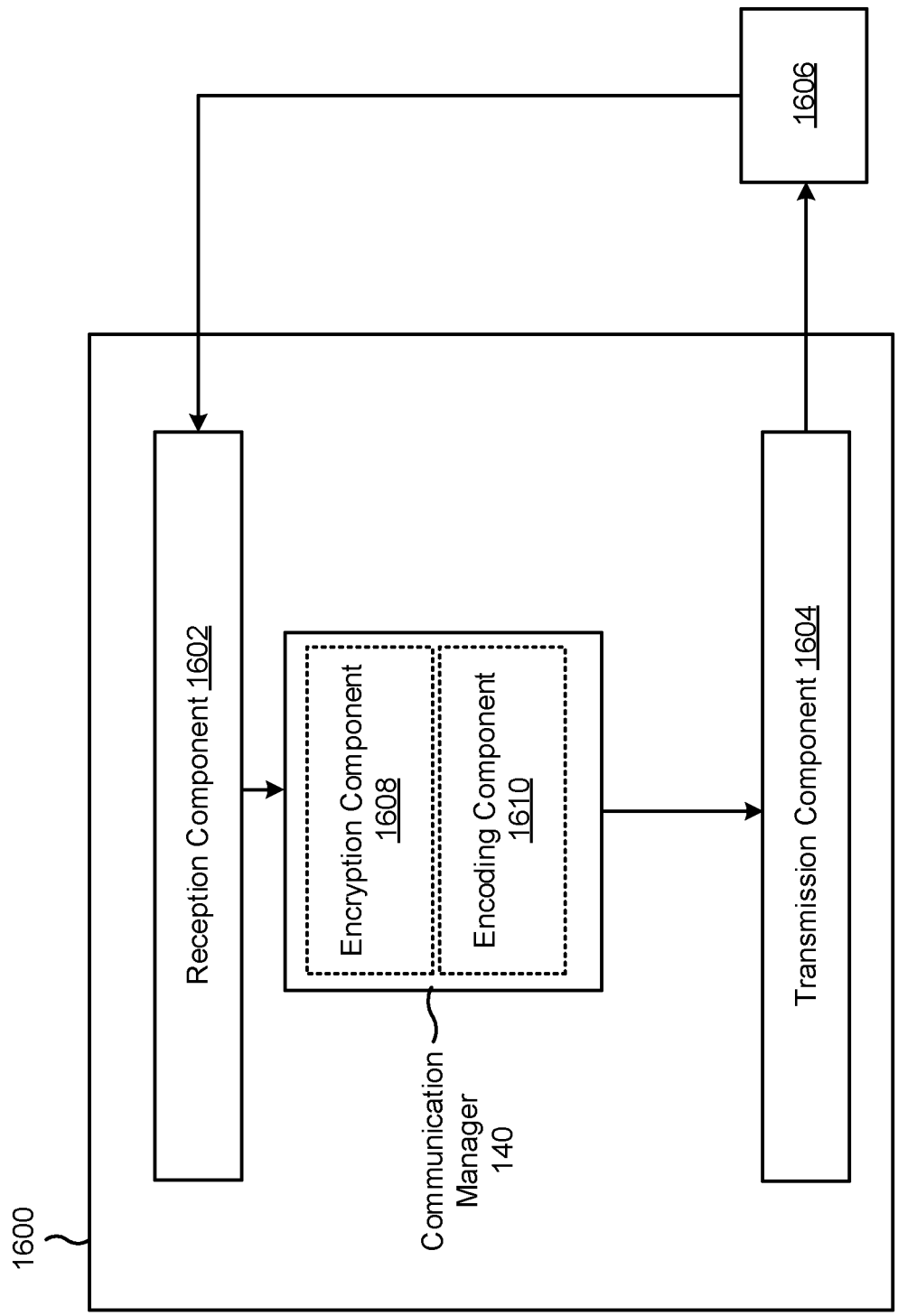
FIGS. 16 and 17 are block diagrams of example apparatuses for wireless communication, in accordance with the present disclosure.

In a second aspect, alone or in combination with the first aspect, process 1200 includes encrypting (e.g., using communication manager 140 and/or encryption component 1608, depicted in FIG. 16) the data using IPsec before instructing the WiFi modem.

In a third aspect, alone or in combination with one or more of the first and second aspects, the first virtual interface is established based at least in part on an IKE procedure with a gateway of an N3IWF.

In a fourth aspect, alone or in combination with one or more of the first through third aspects, the NAS messages from the cellular modem are encrypted based at least in part on the IKE procedure.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
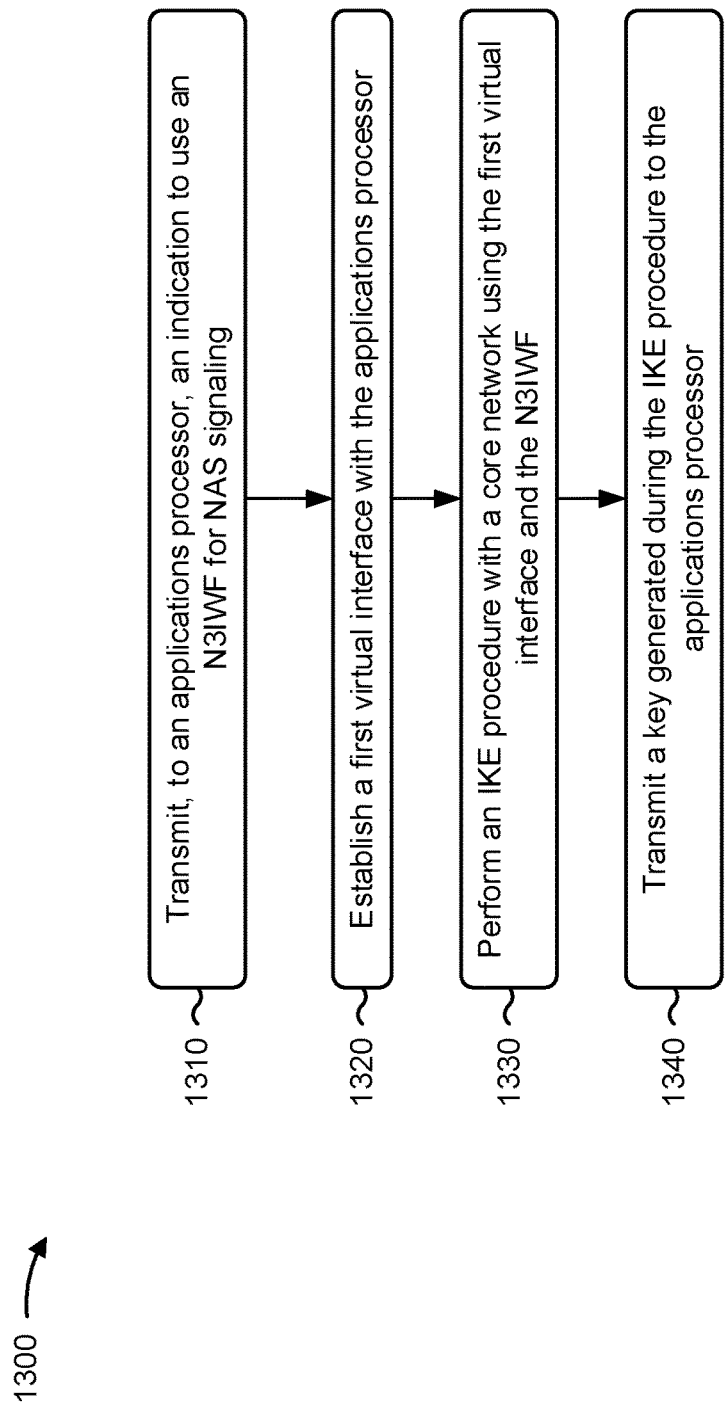

FIG. 13 is a diagram illustrating an example process 1300 performed, for example, by a cellular modem, in accordance with the present disclosure. Example process 1300 is an example where the cellular modem (e.g., cellular modem 307 and/or apparatus 1700 of FIG. 17) performs operations associated with NAS signaling over a non-3GPP network.

As shown in FIG. 13, in some aspects, process 1300 may include transmitting, to an applications processor (e.g., applications processor 301 and/or apparatus 1600 of FIG. 16), an indication to use an N3IWF for NAS signaling (block 1310). For example, the cellular modem (e.g., using communication manager 140 and/or transmission component 1704, depicted in FIG. 17) may transmit, to an applications processor, an indication to use an N3IWF for NAS signaling, as described herein.

As further shown in FIG. 13, in some aspects, process 1300 may include establishing a first virtual interface with the applications processor (block 1320). For example, the cellular modem (e.g., using communication manager 140 and/or virtualization component 1708, depicted in FIG. 17) may establish a first virtual interface with the applications processor, as described herein.

As further shown in FIG. 13, in some aspects, process 1300 may include performing an IKE procedure with a core network using the first virtual interface and the N3IWF (block 1330). For example, the cellular modem (e.g., using communication manager 140, transmission component 1704, and/or reception component 1702, depicted in FIG. 17) may perform an IKE procedure with a core network using the first virtual interface and the N3IWF, as described herein.

As further shown in FIG. 13, in some aspects, process 1300 may include transmitting a key generated during the IKE procedure to the applications processor (block 1340). For example, the cellular modem (e.g., using communication manager 140 and/or transmission component 1704) may transmit a key generated during the IKE procedure to the applications processor, as described herein.

Process 1300 may include additional aspects, such as any single aspect or any combination of aspects described below and/or in connection with one or more other processes described elsewhere herein.

In a first aspect, process 1300 further includes transmitting (e.g., using communication manager 140 and/or transmission component 1704), to the applications processor, at least one of an indicator of an encryption method, a local address associated with the applications processor, or an inner address associated with the applications processor.

Figure 17:
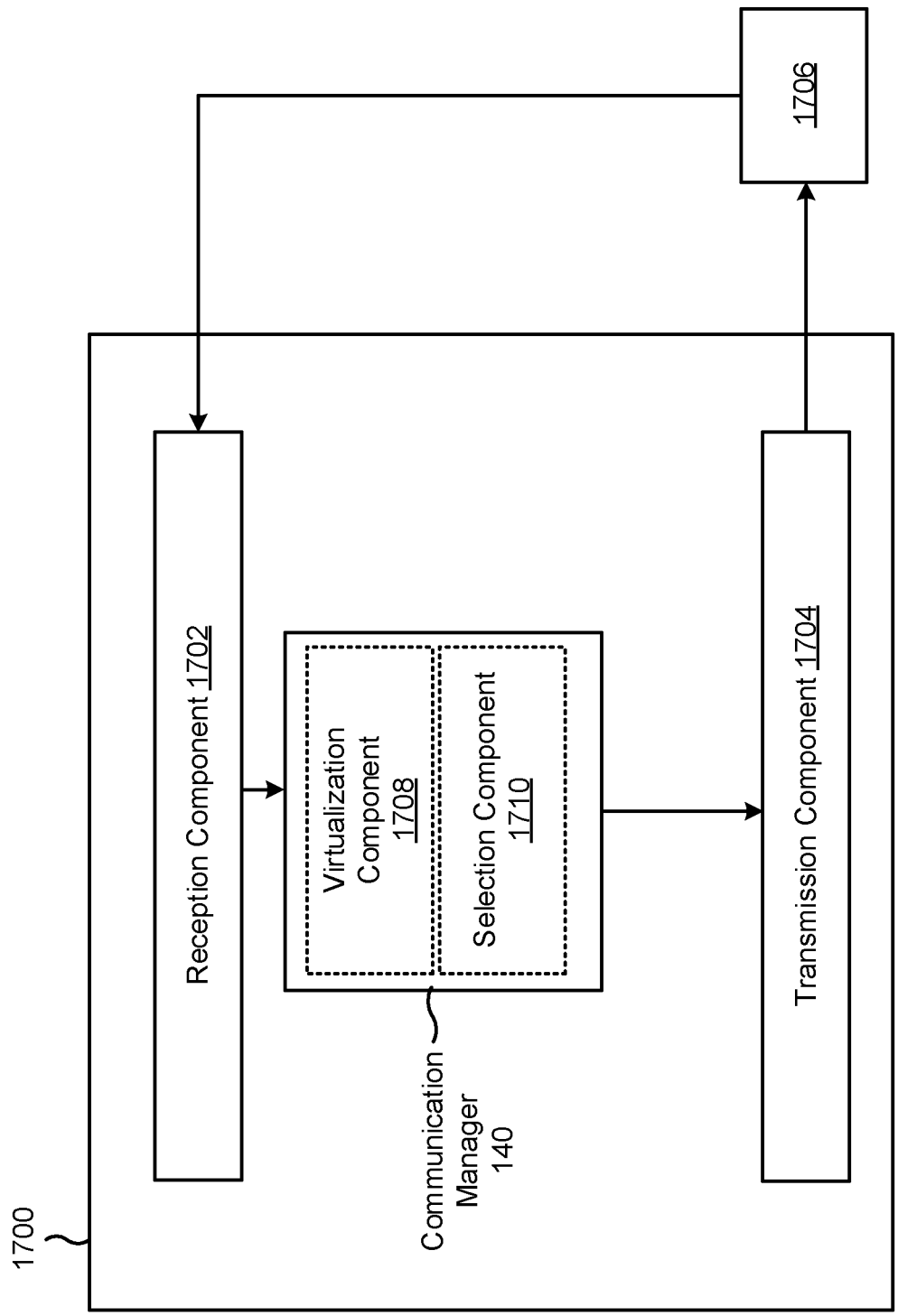

In a second aspect, alone or in combination with the first aspect, process 1300 further includes selecting (e.g., using communication manager 140 and/or selection component 1710, depicted in FIG. 17) the N3IWF based at least in part on a policy associated with the UE.

In a third aspect, alone or in combination with one or more of the first and second aspects, process 1300 further includes establishing (e.g., using communication manager 140 and/or virtualization component 1708) a second virtual interface with the applications processor to use for NAS messages.

In a fourth aspect, alone or in combination with one or more of the first through third aspects, process 1300 further includes transmitting (e.g., using communication manager 140 and/or transmission component 1704), to the applications processor and using the second virtual interface, a PDU including an NAS message and encoded using TCP, the NAS message being transmitted to the core network using the N3IWF.

In a fifth aspect, alone or in combination with one or more of the first through fourth aspects, process 1300 further includes establishing (e.g., using communication manager 140, transmission component 1704, and/or reception component 1702) an IPsec tunnel with an AMF of the core network using the second virtual interface and the N3IWF.

In a sixth aspect, alone or in combination with one or more of the first through fifth aspects, process 1300 further includes establishing (e.g., using communication manager 140 and/or virtualization component 1708) a third virtual interface with the applications processor to use for a user plane.

In a seventh aspect, alone or in combination with one or more of the first through sixth aspects, process 1300 further includes performing (e.g., using communication manager 140, transmission component 1704, and/or reception component 1702) an additional IKE procedure with the core network using the second virtual interface and the N3IWF, and transmitting (e.g., using communication manager 140 and/or transmission component 1704) an additional key generated during the additional IKE procedure to the applications processor, such that the third virtual interface is established based at least in part on the additional IKE procedure.

In an eighth aspect, alone or in combination with one or more of the first through seventh aspects, process 1300 further includes transmitting (e.g., using communication manager 140 and/or transmission component 1704), to the applications processor and using the third virtual interface, a PDU including data and encoded using TCP, the data being transmitted to the core network using the N3IWF.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
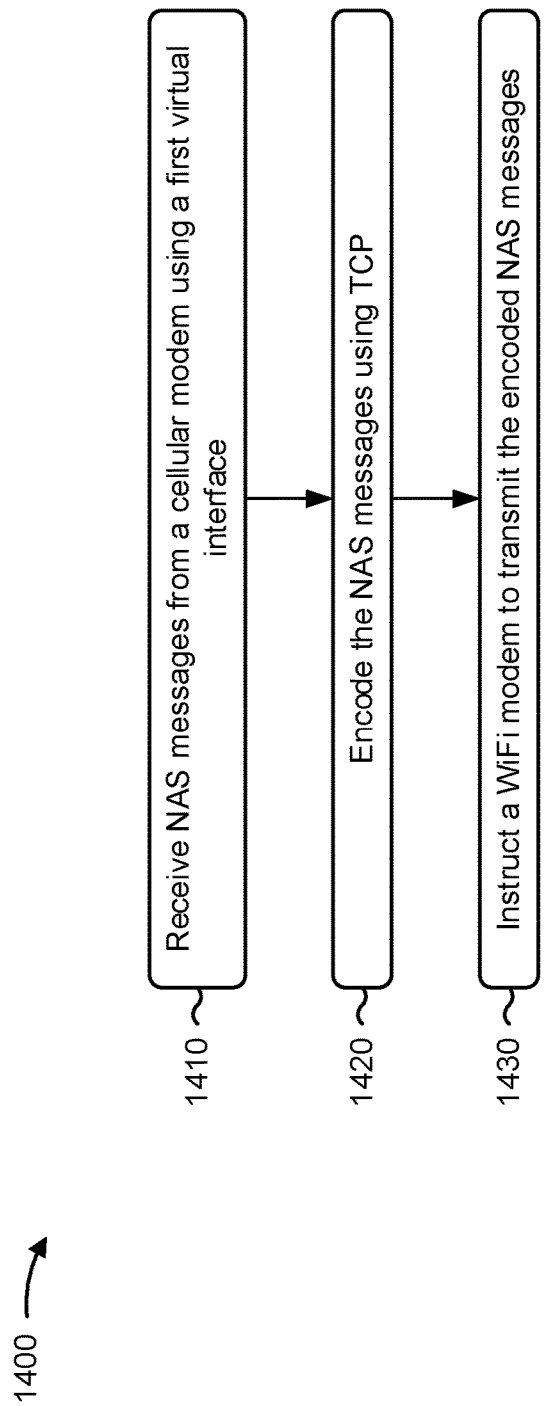

FIG. 14 is a diagram illustrating an example process 1400 performed, for example, by an applications processor, in accordance with the present disclosure. Example process 1400 is an example where the applications processor (e.g., applications processor 401 and/or apparatus 1600 of FIG. 16) performs operations associated with NAS signaling over a non-3GPP network.

As shown in FIG. 14, in some aspects, process 1400 may include receiving NAS messages from a cellular modem (e.g., cellular modem 407 and/or apparatus 1700 of FIG. 17) using a first virtual interface (block 1410). For example, the applications processor (e.g., using communication manager 140 and/or reception component 1602, depicted in FIG. 16)

may receive NAS messages from a cellular modem using a first virtual interface, as described herein.

As further shown in FIG. 14, in some aspects, process 1400 may include encoding the NAS messages using TCP (block 1420). For example, the applications processor (e.g., using communication manager 140 and/or encoding component 1610, depicted in FIG. 16) may encode the NAS messages using TCP, as described herein.

As further shown in FIG. 14, in some aspects, process 1400 may include instructing a WiFi modem to transmit the encoded NAS messages (block 1430). For example, the applications processor (e.g., using communication manager 140 and/or transmission component 1604, depicted in FIG. 16) may instruct a WiFi modem to transmit the encoded NAS messages, as described herein.

Process 1400 may include additional aspects, such as any single aspect or any combination of aspects described below and/or in connection with one or more other processes described elsewhere herein.

In a first aspect, process 1400 further includes receiving (e.g., using communication manager 140 and/or reception component 1602, depicted in FIG. 16), from the cellular modem and using a second virtual interface, data encoded using TCP, and instructing (e.g., using communication manager 140 and/or transmission component 1604) the WiFi modem to transmit the encoded data.

In a second aspect, alone or in combination with the first aspect, process 1400 includes encrypting (e.g., using communication manager 140 and/or encryption component 1608, depicted in FIG. 16) the data using IPsec before instructing the WiFi modem.

In a third aspect, alone or in combination with one or more of the first and second aspects, the first virtual interface is established based at least in part on an IKE procedure with a gateway of an N3IWF.

In a fourth aspect, alone or in combination with one or more of the first through third aspects, process 1400 further includes encrypting (e.g., using communication manager 140 and/or encryption component 1608) the NAS messages based at least in part on the IKE procedure before instructing the WiFi modem.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
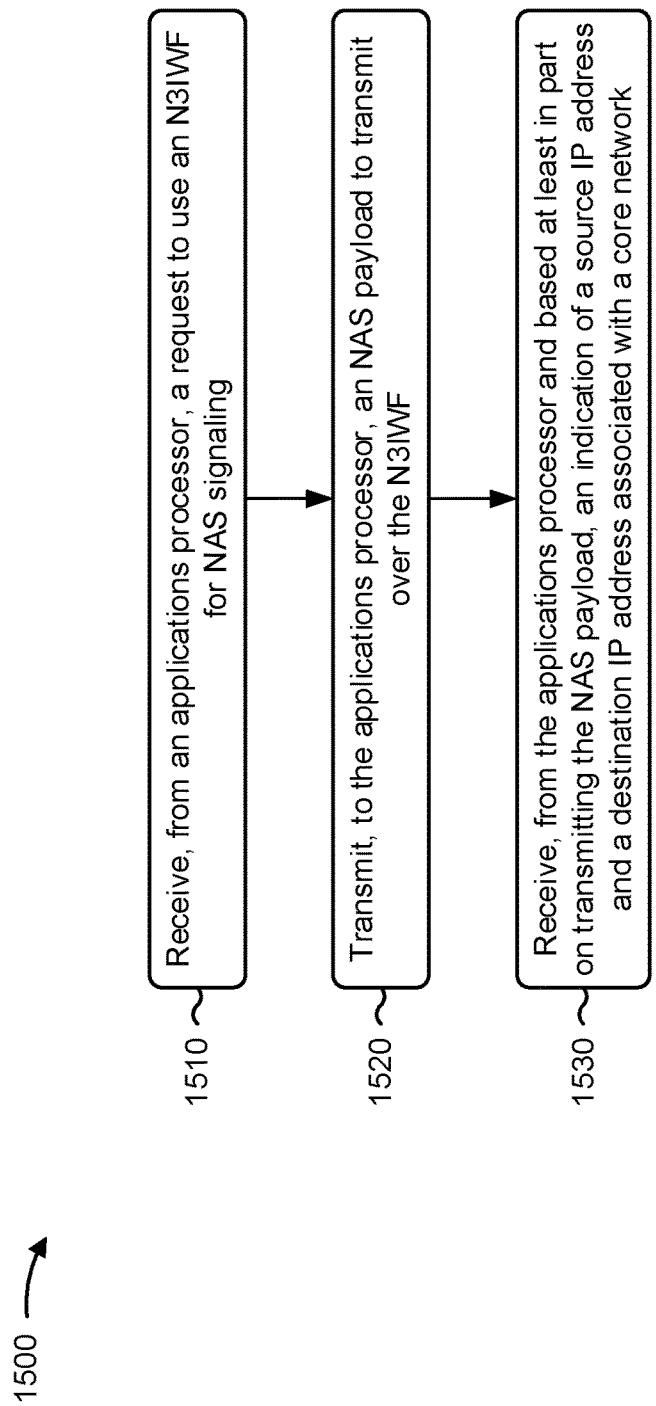

FIG. 15 is a diagram illustrating an example process 1500 performed, for example, by a cellular modem, in accordance with the present disclosure. Example process 1500 is an example where the cellular modem (e.g., cellular modem 407 and/or apparatus 1700 of FIG. 17) performs operations associated with NAS signaling over a non-3GPP network.

As shown in FIG. 15, in some aspects, process 1500 may include receiving, from an applications processor (e.g., applications processor 401 and/or apparatus 1600 of FIG. 16), a request to use an N3IWF for NAS signaling (block 1510). For example, the cellular modem (e.g., using communication manager 140 and/or reception component 1702, depicted in FIG. 17) may receive, from an applications processor, a request to use an N3IWF for NAS signaling, as described herein.

As further shown in FIG. 15, in some aspects, process 1500 may include transmitting, to the applications processor, an NAS payload to transmit over the N3IWF (block 1520). For example, the cellular modem (e.g., using communication manager 140 and/or transmission component 1704, depicted in FIG. 17) may transmit, to the applications processor, an NAS payload to transmit over the N3IWF, as described herein.

As further shown in FIG. 15, in some aspects, process 1500 may include receiving, from the applications processor and based at least in part on transmitting the NAS payload, an indication of a source IP address and a destination IP address associated with a core network (block 1530). For example, the cellular modem (e.g., using communication manager 140 and/or reception component 1702) may receive, from the applications processor and based at least in part on transmitting the NAS payload, an indication of a source IP address and a destination IP address associated with a core network, as described herein.

Process 1500 may include additional aspects, such as any single aspect or any combination of aspects described below and/or in connection with one or more other processes described elsewhere herein.

In a first aspect, process 1500 further includes receiving (e.g., using communication manager 140 and/or reception component 1702), from the applications processor, an indication of a destination port associated with the core network.

In a second aspect, alone or in combination with the first aspect, process 1500 further includes transmitting (e.g., using communication manager 140 and/or transmission component 1704), to the applications processor, an identifier associated with the UE.

In a third aspect, alone or in combination with one or more of the first and second aspects, process 1500 further includes receiving (e.g., using communication manager 140 and/or reception component 1702), from the applications processor, a request to use the N3IWF based at least in part on a policy associated with the UE.

In a fourth aspect, alone or in combination with one or more of the first through third aspects, process 1500 further includes establishing (e.g., using communication manager 140 and/or virtualization component 1708, depicted in FIG. 17) a first virtual interface with the applications processor to use for NAS messages.

In a fifth aspect, alone or in combination with one or more of the first through fourth aspects, process 1500 further includes transmitting (e.g., using communication manager 140 and/or transmission component 1704), to the applications processor and using the first virtual interface, a PDU including an NAS message and encoded using TCP, the NAS message being transmitted to the core network using the N3IWF.

In a sixth aspect, alone or in combination with one or more of the first through fifth aspects, process 1500 further includes establishing (e.g., using communication manager 140, reception component 1702, and/or transmission component 1704) an IPsec tunnel with an AMF of the core network using the first virtual interface and the N3IWF.

In a seventh aspect, alone or in combination with one or more of the first through sixth aspects, process 1500 further includes establishing (e.g., using communication manager 140 and/or virtualization component 1708) a second virtual interface with the applications processor to use for a user plane.

In an eighth aspect, alone or in combination with one or more of the first through seventh aspects, process 1500 further includes receiving (e.g., using communication manager 140 and/or reception component 1702), from the applications processor, an indication of an IP address associated with the user plane, such that the second virtual interface is established based at least in part on receiving the IP address associated with the user plane.

In a ninth aspect, alone or in combination with one or more of the first through eighth aspects, process 1500 further includes transmitting (e.g., using communication manager 140 and/or transmission component 1704), to the applications processor and using the second virtual interface, a PDU including data and encoded using TCP, the data being transmitted to the core network using the N3IWF.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

FIG. 16 is a block diagram of an example apparatus 1600 for wireless communication. The apparatus 1600 may be a applications processor, or a applications processor may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a WiFi modem, a cellular modem, or another wireless communication device) using the reception component 1602 and the transmission component 1604. As further shown, the apparatus 1600 may include the communication manager 140. The communication manager 140 may include one or more of an encryption component 1608 or an encoding component 1610, among other examples.

In some aspects, the apparatus 1600 may be configured to perform one or more operations described herein in connection with FIGS. 3-11B. Additionally, or alternatively, the apparatus 1600 may be configured to perform one or more processes described herein, such as process 1200 of FIG. 12, process 1400 of FIG. 14, or a combination thereof. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described in connection with FIG. 2. Additionally, or alternatively, the reception component 1602 may include a receiver on a wired connection to the apparatus 1606.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described in connection with FIG. 2. Additionally, or alternatively, the transmission component 1604 may include a transmitter on a wired connection to the apparatus 1606. In some aspects, the transmission component 1604 may be co-located with the reception component 1602 in a transceiver.

In some aspects, the reception component 1602 may receive NAS messages from a cellular modem (e.g., the apparatus 1606) using a first virtual interface. The NAS messages may be encoded using TCP. Accordingly, the transmission component 1604 may instruct a WiFi modem to transmit the encoded NAS messages.

Additionally, or alternatively, in some aspects, the reception component 1602 may receive, from the apparatus 1606 and using a second virtual interface, data encoded using TCP. Accordingly, the transmission component 1604 may instruct a WiFi modem to transmit the encoded data. In some aspects, the encryption component 1608 may encrypt the data using IPsec before instructing the WiFi modem. The encryption component 1608 may include a transmit MIMO processor, a transmit processor, a MIMO detector, a receive processor, a controller/processor, a memory, or a combination thereof, of the UE described in connection with FIG. 2.

Additionally, or alternatively, the reception component 1602 may receive NAS messages from the apparatus 1606 using a first virtual interface, and the encoding component 1610 may encode the NAS messages using TCP. The encoding component 1610 may include a transmit MIMO processor, a transmit processor, a MIMO detector, a receive processor, a controller/processor, a memory, or a combination thereof, of the UE described in connection with FIG. 2. Accordingly, the transmission component 1604 may instruct a WiFi modem to transmit the encoded NAS messages. In some aspects, the encryption component 1608 may encrypt the NAS messages based at least in part on an IKE procedure before instructing the WiFi modem.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

FIG. 17 is a block diagram of an example apparatus 1700 for wireless communication. The apparatus 1700 may be a cellular modem, or a cellular modem may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, another wireless communication device, or an applications processor) using the reception component 1702 and the transmission component 1704. As further shown, the apparatus 1700 may include the communication manager 140. The communication manager 140 may include one or more of a virtualization component 1708 or a selection component 1710, among other examples.

In some aspects, the apparatus 1700 may be configured to perform one or more operations described herein in connection with FIGS. 3-11B. Additionally, or alternatively, the apparatus 1700 may be configured to perform one or more processes described herein, such as process 1300 of FIG. 13, process 1500 of FIG. 15, or a combination thereof. In some aspects, the apparatus 1700 and/or one or more components shown in FIG. 17 may include one or more components of the UE described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the UE described in connection with FIG. 2. Additionally, or alternatively, the reception component 1702 may include a receiver on a wired connection to the apparatus 1706.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. Additionally, or alternatively, the transmission component 1704 may include a transmitter on a wired connection to the apparatus 1706. In some aspects, the transmission component 1704 may include one or more antennas, a modulator, a transmit MIMO processor, a transmit processor, a controller/processor, a memory, or a combination thereof, of the UE described in connection with FIG. 2. In some aspects, the transmission component 1704 may be co-located with the reception component 1702 in a transceiver.

In some aspects, the transmission component 1704 may transmit, to an applications processor (e.g., the apparatus 1706), an indication to use an N3IWF for NAS signaling. Accordingly, the virtualization component 1708 may establish a first virtual interface with the apparatus 1706. The virtualization component 1708 may include a MIMO detector, a receive processor, a transmit MIMO processor, a transmit processor, a controller/processor, a memory, or a combination thereof, of the UE described in connection with FIG. 2. The reception component 1702 and the transmission component 1704 may perform an IKE procedure with a core network using the first virtual interface and the N3IWF. Accordingly, the transmission component 1704 may transmit a key generated during the IKE procedure to the apparatus 1706.

As an alternative, the reception component 1702 may receive, from the apparatus 1706, a request to use an N3IWF for NAS signaling. Accordingly, the transmission component 1704 may transmit, to the apparatus 1706, an NAS payload to transmit over the N3IWF. The reception component 1702 may receive, from the apparatus 1706 and based at least in part on the transmission component 1704 transmitting the NAS payload, an indication of a source IP address and a destination IP address associated with a core network.

In some aspects, the transmission component 1704 may transmit, to the apparatus 1706, at least one of an indicator of an encryption method, a local address associated with the applications processor, or an inner address associated with the applications processor. Additionally, or alternatively, the reception component 1702 may receive, from the apparatus 1706, an indication of a destination port associated with the core network, and/or the transmission component 1704 may transmit, to the apparatus 1706, an identifier associated with the apparatus 1700.

In some aspects, the selection component 1710 may select the N3IWF based at least in part on a policy associated with the apparatus 1700. The selection component 1710 may include a MIMO detector, a receive processor, a transmit MIMO processor, a transmit processor, a controller/processor, a memory, or a combination thereof, of the UE described in connection with FIG. 2.

In some aspects, the virtualization component 1708 may establish a second virtual interface with the apparatus 1706 to use for NAS messages. Accordingly, the transmission component 1704 may transmit, to the apparatus 1706 and using the second virtual interface, a PDU including an NAS message and encoded using TCP such that the NAS message is transmitted to the core network using the N3IWF. Additionally, or alternatively, the reception component 1702 and the transmission component 1704 may establish an IPsec tunnel with an AMF of the core network using the second virtual interface and the N3IWF.

In some aspects, the virtualization component 1708 may establish a third virtual interface with the apparatus 1706 to use for a user plane. Accordingly, the reception component 1702 and the transmission component 1704 may perform an additional IKE procedure with the core network using the second virtual interface and the N3IWF. The transmission component 1704 may transmit an additional key generated during the additional IKE procedure to the apparatus 1706 such that the third virtual interface is established based at least in part on the additional IKE procedure. As an alternative, the reception component 1702 may receive, from the apparatus 1706, an indication of an IP address associated with the user plane such that the second virtual interface is established based at least in part on the reception component 1702 receiving the IP address associated with the user plane. Accordingly, the transmission component 1704 may transmit, to the apparatus 1706 and using the third virtual interface, a PDU including data and encoded using TCP such that the data is transmitted to the core network using the N3IWF.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by an applications processor of a user equipment (UE), comprising: receiving non-access stratum (NAS) messages from a cellular modem using a first virtual interface, wherein the NAS messages are encoded using transmission control protocol (TCP); and instructing a WiFi modem to transmit the encoded NAS messages.

Aspect 2: The method of Aspect 1, further comprising: receiving, from the cellular modem and using a second virtual interface, data encoded using TCP; and instructing the WiFi modem to transmit the encoded data.

Aspect 3: The method of Aspect 2, further comprising: encrypting the data using Internet Protocol Security (IPsec) before instructing the WiFi modem.

Aspect 4: The method of any of Aspects 1 through 3, wherein the first virtual interface is established based at least in part on an Internet Key Exchange (IKE) procedure with a gateway of a non-Third Generation Partnership Project (non-3GPP) interworking function (N3IWF).

Aspect 5: The method of Aspect 4, wherein the NAS messages from the cellular modem are encrypted based at least in part on the IKE procedure.

Aspect 6: A method of wireless communication performed by a cellular modem of a user equipment (UE), comprising: transmitting, to an applications processor, an indication to use a non-Third Generation Partnership Project (non-3GPP) interworking function (N3IWF) for non-access stratum (NAS) signaling; establishing a first virtual interface with the applications processor; performing an Internet Key Exchange (IKE) procedure with a core network using the first virtual interface and the N3IWF; and transmitting a key generated during the IKE procedure to the applications processor.

Aspect 7: The method of Aspect 6, further comprising: transmitting, to the applications processor, at least one of an indicator of an encryption method, a local address associated with the applications processor, or an inner address associated with the applications processor.

Aspect 8: The method of any of Aspects 6 through 7, further comprising: selecting the N3IWF based at least in part on a policy associated with the UE.

Aspect 9: The method of any of Aspects 6 through 8, further comprising: establishing a second virtual interface with the applications processor to use for NAS messages.

Aspect 10: The method of Aspect 9, further comprising: transmitting, to the applications processor and using the second virtual interface, a protocol data unit (PDU) including an NAS message and encoded using transmission control protocol (TCP), wherein the NAS message is transmitted to the core network using the N3IWF.

Aspect 11: The method of any of Aspects 9 through 10, further comprising: establishing an Internet Protocol Security (IPsec) tunnel with an access and mobility function (AMF) of the core network using the second virtual interface and the N3IWF.

Aspect 12: The method of any of Aspects 9 through 11, further comprising: establishing a third virtual interface with the applications processor to use for a user plane.

Aspect 13: The method of Aspect 12, further comprising: performing an additional IKE procedure with the core network using the second virtual interface and the N3IWF; and transmitting an additional key generated during the additional IKE procedure to the applications processor, wherein the third virtual interface is established based at least in part on the additional IKE procedure.

Aspect 14: The method of any of Aspects 12 through 13, further comprising: transmitting, to the applications processor and using the third virtual interface, a protocol data unit (PDU) including data and encoded using transmission control protocol (TCP), wherein the data is transmitted to the core network using the N3IWF.

Aspect 15: A method of wireless communication performed by an applications processor of a user equipment (UE), comprising: receiving non-access stratum (NAS) messages from a cellular modem using a first virtual interface; encoding the NAS messages using transmission control protocol (TCP); and instructing a WiFi modem to transmit the encoded NAS messages.

Aspect 16: The method of Aspect 15, further comprising: receiving, from the cellular modem and using a second virtual interface, data encoded using TCP; and instructing the WiFi modem to transmit the encoded data.

Aspect 17: The method of Aspect 16, further comprising: encrypting the data using Internet Protocol Security (IPsec) before instructing the WiFi modem.

Aspect 18: The method of any of Aspects 15 through 17, wherein the first virtual interface is established based at least in part on an Internet Key Exchange (IKE) procedure with a gateway of a non-Third Generation Partnership Project (non-3GPP) interworking function (N3IWF).

Aspect 19: The method of Aspect 18, further comprising: encrypting the NAS messages based at least in part on the IKE procedure before instructing the WiFi modem.

Aspect 20: A method of wireless communication performed by a cellular modem of a user equipment (UE), comprising: receiving, from an applications processor, a request to use a non-Third Generation Partnership Project (non-3GPP) interworking function (N3IWF) for non-access stratum (NAS) signaling; transmitting, to the applications processor, an NAS payload to transmit over the N3IWF; and receiving, from the applications processor and based at least in part on transmitting the NAS payload, an indication of a source Internet protocol (IP) address and a destination IP address associated with a core network.

Aspect 21: The method of Aspect 20, further comprising: receiving, from the applications processor, an indication of a destination port associated with the core network.

Aspect 22: The method of any of Aspects 20 through 21, further comprising: transmitting, to the applications processor, an identifier associated with the UE.

Aspect 23: The method of any of Aspects 20 through 22, further comprising: receiving, from the applications processor, a request to use the N3IWF based at least in part on a policy associated with the UE.

Aspect 24: The method of any of Aspects 20 through 23, further comprising: establishing a first virtual interface with the applications processor to use for NAS messages.

Aspect 25: The method of Aspect 24, further comprising: transmitting, to the applications processor and using the first virtual interface, a protocol data unit (PDU) including an NAS message and encoded using transmission control protocol (TCP), wherein the NAS message is transmitted to the core network using the N3IWF.

Aspect 26: The method of any of Aspects 24 through 25, further comprising: establishing an Internet Protocol Security (IPsec) tunnel with an access and mobility function (AMF) of the core network using the first virtual interface and the N3IWF.

Aspect 27: The method of any of Aspects 24 through 26, further comprising: establishing a second virtual interface with the applications processor to use for a user plane.

Aspect 28: The method of Aspect 27, further comprising: receiving, from the applications processor, an indication of an IP address associated with the user plane, wherein the second virtual interface is established based at least in part on receiving the IP address associated with the user plane.

Aspect 29: The method of any of Aspects 27 through 28, further comprising: transmitting, to the applications processor and using the second virtual interface, a protocol data unit (PDU) including data and encoded using transmission control protocol (TCP), wherein the data is transmitted to the core network using the N3IWF.

Aspect 30: An apparatus for wireless communication at a device, comprising a processor; memory coupled with the processor; and instructions stored in the memory and executable by the processor to cause the apparatus to perform the method of one or more of Aspects 1-5.

Aspect 31: A device for wireless communication, comprising a memory and one or more processors coupled to the memory, the one or more processors configured to perform the method of one or more of Aspects 1-5.

Aspect 32: An apparatus for wireless communication, comprising at least one means for performing the method of one or more of Aspects 1-5.

Aspect 33: A non-transitory computer-readable medium storing code for wireless communication, the code comprising instructions executable by a processor to perform the method of one or more of Aspects 1-5.

Aspect 34: A non-transitory computer-readable medium storing a set of instructions for wireless communication, the set of instructions comprising one or more instructions that, when executed by one or more processors of a device, cause the device to perform the method of one or more of Aspects 1-5.

Aspect 35: An apparatus for wireless communication at a device, comprising a processor; memory coupled with the processor; and instructions stored in the memory and executable by the processor to cause the apparatus to perform the method of one or more of Aspects 6-14.

Aspect 36: A device for wireless communication, comprising a memory and one or more processors coupled to the memory, the one or more processors configured to perform the method of one or more of Aspects 6-14.

Aspect 37: An apparatus for wireless communication, comprising at least one means for performing the method of one or more of Aspects 6-14.

Aspect 38: A non-transitory computer-readable medium storing code for wireless communication, the code comprising instructions executable by a processor to perform the method of one or more of Aspects 6-14.

Aspect 39: A non-transitory computer-readable medium storing a set of instructions for wireless communication, the set of instructions comprising one or more instructions that, when executed by one or more processors of a device, cause the device to perform the method of one or more of Aspects 6-14.

Aspect 40: An apparatus for wireless communication at a device, comprising a processor; memory coupled with the processor; and instructions stored in the memory and executable by the processor to cause the apparatus to perform the method of one or more of Aspects 15-19.

Aspect 41: A device for wireless communication, comprising a memory and one or more processors coupled to the memory, the one or more processors configured to perform the method of one or more of Aspects 15-19.

Aspect 42: An apparatus for wireless communication, comprising at least one means for performing the method of one or more of Aspects 15-19.

Aspect 43: A non-transitory computer-readable medium storing code for wireless communication, the code comprising instructions executable by a processor to perform the method of one or more of Aspects 15-19.

Aspect 44: A non-transitory computer-readable medium storing a set of instructions for wireless communication, the set of instructions comprising one or more instructions that, when executed by one or more processors of a device, cause the device to perform the method of one or more of Aspects 15-19.

Aspect 45: An apparatus for wireless communication at a device, comprising a processor; memory coupled with the processor; and instructions stored in the memory and executable by the processor to cause the apparatus to perform the method of one or more of Aspects 20-29.

Aspect 46: A device for wireless communication, comprising a memory and one or more processors coupled to the memory, the one or more processors configured to perform the method of one or more of Aspects 20-29.

Aspect 47: An apparatus for wireless communication, comprising at least one means for performing the method of one or more of Aspects 20-29.

Aspect 48: A non-transitory computer-readable medium storing code for wireless communication, the code comprising instructions executable by a processor to perform the method of one or more of Aspects 20-29.

Aspect 49: A non-transitory computer-readable medium storing a set of instructions for wireless communication, the set of instructions comprising one or more instructions that, when executed by one or more processors of a device, cause the device to perform the method of one or more of Aspects 20-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising an applications processor and a cellular modem:
   the applications processor configured to:
   receive, from the cellular modem, an indication to use a non-Third Generation Partnership Project (non-3GPP) interworking function (N3IWF) for non-access stratum (NAS) signaling;
   receive, from the cellular modem, a key generated during an Internet Key Exchange (IKE) procedure;
   receive, based at least in part on the key being received, encoded NAS messages from the cellular modem using a first virtual interface, wherein the encoded NAS messages are encoded using transmission control protocol (TCP);
   instruct a WIFI modem to transmit the encoded NAS messages; and
   the cellular modem configured to:
   transmit, to the applications processor, the indication to use the N3IWF for NAS signaling;
   establish a second virtual interface with the applications processor;
   perform the IKE procedure with a core network using the second virtual interface and the N3IWF; and
   transmit the key generated during the IKE procedure to the applications processor.

2. The UE of claim 1, wherein the applications processor is further configured to:
   receive, from the cellular modem and using the second virtual interface, data encoded using the TCP; and
   instruct the WiFi modem to transmit the encoded data.

3. The UE of claim 2, wherein the applications processor is further configured to:
   encrypt the encoded data using Internet Protocol Security (IPsec) before instructing the WiFi modem.

4. The UE of claim 1, wherein the first virtual interface is established based at least in part on the IKE procedure with a gateway of the N3IWF.

5. The UE of claim 4, wherein the encoded NAS messages are encrypted based at least in part on the IKE procedure.

6. The UE of claim 1, wherein the cellular modem is further configured to transmit, to the applications processor, at least one of an indicator of an encryption method, a local address associated with the applications processor, or an inner address associated with the applications processor.

7. The UE of claim 1, wherein the cellular modem is further configured to select the N3IWF based at least in part on a policy associated with the UE.

8. The UE of claim 1, wherein the cellular modem is further configured to:
   establish the first virtual interface with the applications processor to use for encoded NAS messages.

9. The UE of claim 8, wherein the cellular modem is further configured to:
   transmit, to the applications processor and using the first virtual interface, a protocol data unit (PDU) including an encoded NAS message of the encoded NAS messages and encoded using the TCP, wherein the encoded NAS message is transmitted to the core network using the N3IWF.

10. The UE of claim 8, wherein the cellular modem is further configured to:

establish an Internet Protocol Security (IPsec) tunnel with an access and mobility function (AMF) of the core network using the first virtual interface and the N3IWF.

11. The UE of claim 8, wherein the cellular modem is further configured to:
establish a third virtual interface with the applications processor to use for a user plane.

12. The UE of claim 11, wherein the cellular modem is further configured to:
perform an additional IKE procedure with the core network using the first virtual interface and the N3IWF; and
transmit an additional key generated during the additional IKE procedure to the applications processor,
wherein the third virtual interface is established based at least in part on the additional IKE procedure.

13. The UE of claim 11, wherein the cellular modem is further configured to:
transmit, to the applications processor and using the third virtual interface, a protocol data unit (PDU) including data and encoded using the TCP,
wherein the data is transmitted to the core network using the N3IWF.

14. A method for wireless communication at a user equipment (UE), comprising:
receiving, via an applications processor of the UE, from a cellular modem of the UE, an indication to use a non-Third Generation Partnership Project (non-3GPP) interworking function (N3IWF) for non-access stratum (NAS) signaling;
receiving, via the application processor and from the cellular modem, a key generated during an Internet Key Exchange (IKE) procedure;
receiving, via the applications processor and based at least in part on the key being received, encoded NAS messages from the cellular modem using a first virtual interface, wherein the encoded NAS messages are encoded using transmission control protocol (TCP);
instructing, via the applications processor, a WiFi modem to transmit the encoded NAS messages;
transmitting, via the cellular modem to the applications processor, the indication to use the N3IWF for NAS signaling;
establishing, via the cellular modem, a second virtual interface with the applications processor;
performing, via the cellular modem, the IKE procedure with a core network using the second virtual interface and the N3IWF; and
transmitting, via the cellular modem to the applications processor, the key generated during the IKE procedure to the applications processor.

15. The method of claim 14, further comprising:
receiving, from the cellular modem and using the second virtual interface, data encoded using the TCP; and
instructing the WiFi modem to transmit the encoded data.

16. The method of claim 15, further comprising:
encrypting the encoded data using Internet Protocol Security (IPsec) before instructing the WiFi modem.

17. The method of claim 14, wherein the first virtual interface is established based at least in part on the IKE procedure with a gateway of the N3IWF.

18. The method of claim 17, wherein the encoded NAS messages are encrypted based at least in part on the IKE procedure.

19. The method of claim 14, further comprising:
transmitting, via the cellular modem, to the applications processor, at least one of an indicator of an encryption method, a local address associated with the applications processor, or an inner address associated with the applications processor.

20. The method of claim 14, further comprising:
selecting, via the cellular modem, the N3IWF based at least in part on a policy associated with the UE.

21. The method of claim 14, further comprising:
establishing, via the cellular modem, the first virtual interface with the applications processor to use for the encoded NAS messages.

22. The method of claim 21, further comprising:
transmitting, via the cellular modem, to the applications processor and using the first virtual interface, a protocol data unit (PDU) including an encoded NAS message of the encoded NAS messages and encoded using the TCP,
wherein the encoded NAS message is transmitted to the core network using the N3IWF.

23. The method of claim 21, further comprising:
establishing, via the cellular modem, an Internet Protocol Security (IPsec) tunnel with an access and mobility function (AMF) of the core network using the first virtual interface and the N3IWF.

24. The method of claim 21, further comprising:
establishing, via the cellular modem, a third virtual interface with the applications processor to use for a user plane.

25. The method of claim 24, further comprising:
performing, via the cellular modem, an additional IKE procedure with the core network using the first virtual interface and the N3IWF; and
transmitting, via the cellular modem, an additional key generated during the additional IKE procedure to the applications processor,
wherein the third virtual interface is established based at least in part on the additional IKE procedure.

26. The method of claim 24, further comprising:
transmitting, via the cellular modem, to the applications processor and using the third virtual interface, a protocol data unit (PDU) including data and encoded using the TCP,
wherein the data is transmitted to the core network using the N3IWF.

27. A non-transitory computer-readable medium storing a set of instructions for wireless communication, the set of instructions including one or more instructions that, when executed by user equipment (UE), cause the UE to:
receive, via an applications processor of the UE, from a cellular modem of the UE, an indication to use a non-Third Generation Partnership Project (non-3GPP) interworking function (N3IWF) for non-access stratum (NAS) signaling;
receive, via the applications processor and from the cellular modem, a key generated during an Internet Key Exchange (IKE) procedure;
receive, via the applications processor and based at least in part on the key being received, encoded NAS messages from the cellular modem using a first virtual interface, wherein the encoded NAS messages are encoded using transmission control protocol (TCP);
instruct via the applications processor, a WiFi modem to transmit the encoded NAS messages:
transmit, via the cellular modem to the applications processor, the indication to use the N3IWF for NAS signaling;
establish, via the cellular modem, a second virtual interface with the applications processor perform, via the cellular modem, the IKE procedure with a core network using the second virtual interface and the N3IWF; and transmit, via the cellular modem to the applications processor, the key generated during the IKE procedure to the applications processor.

28. The non-transitory computer-readable medium of claim 27, wherein the first virtual interface is established based at least in part on the IKE procedure with a gateway of the N3IWF.

29. The non-transitory computer-readable medium of claim 28, wherein the encoded NAS messages are encrypted based at least in part on the IKE procedure.

* * * * *